(12) United States Patent
Miller et al.

(10) Patent No.: US 9,351,443 B2
(45) Date of Patent: May 31, 2016

(54) HARVESTER WITH AUTOMATIC DEPTH AND LEVEL CONTROL

(71) Applicant: Amity Technology, LLC, Fargo, ND (US)

(72) Inventors: Collin David Miller, Mapleton, ND (US); Blair Robert Stoltman, Ada, MN (US); Joel Thomas Aslakson, Fargo, ND (US)

(73) Assignee: Amity Technology, LLC, Fargo, ND (US)

( * ) Notice: Subject to any disclaimer, the term of this patent is extended or adjusted under 35 U.S.C. 154(b) by 0 days.

(21) Appl. No.: 14/611,596

(22) Filed: Feb. 2, 2015

(65) Prior Publication Data

US 2015/0149051 A1    May 28, 2015

Related U.S. Application Data

(62) Division of application No. 13/273,582, filed on Oct. 14, 2011, now Pat. No. 8,943,788.

(60) Provisional application No. 61/455,043, filed on Oct. 14, 2010.

(51) Int. Cl.
*A01D 75/28* (2006.01)
*A01D 33/14* (2006.01)
*A01D 41/14* (2006.01)

(52) U.S. Cl.
CPC ............ *A01D 75/28* (2013.01); *A01D 33/14* (2013.01); *A01D 75/285* (2013.01); *A01D 41/141* (2013.01)

(58) Field of Classification Search
CPC ....... A01D 75/00; A01D 75/28; A01D 33/14; A01D 41/141; A01D 75/285
USPC .............. 701/50; 56/10.2 R, 15.7–15.9, 16.2, 56/208–210, 211–217, DIG. 3, DIG. 10; 171/139; 172/4–6
See application file for complete search history.

(56) References Cited

U.S. PATENT DOCUMENTS 2,753,675 A    7/1956  Harp
2,935,137 A    5/1960  Schmidt
(Continued)

FOREIGN PATENT DOCUMENTS

DE    3237861    4/1984
EP    1772050    4/2007

OTHER PUBLICATIONS

Amity Technology, Sugar Beet Harvesters and Defoliators Brochure, Mar. 2008, Fargo, ND (6 pages).
(Continued)

*Primary Examiner* — Thomas Tarcza
*Assistant Examiner* — Tyler J Lee
(74) *Attorney, Agent, or Firm* — Mai-Tram D. Lauer; Westman, Champlin & Koehler, P.A.

(57) ABSTRACT

In one aspect, the disclosure describes an apparatus that harvests crops as the apparatus moves in a direction of travel across a field. The apparatus includes a crop harvesting assembly configured as a line of implements, the line being transverse to the direction of travel. First and second devices for adjusting a vertical position of left and right sides of the apparatus, respectively, are independently operable. Adjustment of a vertical position of at least one of the left and right sides of the apparatus results in tilting the line of implements relative to a horizontal plane defined at a ground surface under left and right ground contacting elements. In other aspects, a method and system are disclosed for automatically positioning a line of implements of an apparatus to follow a ground surface proximate the line of implements.

18 Claims, 18 Drawing Sheets

(56) References Cited

U.S. PATENT DOCUMENTS

| | | |
|---|---|---|
| 3,474,607 A | 10/1969 | Burrough et al. |
| 3,603,404 A | 9/1971 | Whitsed |
| 3,675,404 A | 7/1972 | Izakson |
| 3,731,470 A | 5/1973 | Cornish et al. |
| 3,810,513 A | 5/1974 | Spiller et al. |
| 3,844,357 A | 10/1974 | Ellinger |
| 3,975,890 A | 8/1976 | Rodger |
| 4,031,962 A | 6/1977 | Ellinger |
| 4,031,963 A | 6/1977 | Poggemiller et al. |
| 4,176,721 A | 12/1979 | Poggemiller et al. |
| 4,177,628 A | 12/1979 | Brandt |
| 4,204,385 A | 5/1980 | Taylor |
| 4,385,353 A | 5/1983 | Schneider |
| 4,414,792 A | 11/1983 | Bettencourt |
| 4,616,712 A | 10/1986 | Jorgensen |
| 4,640,365 A | 2/1987 | Schmidt |
| 4,733,523 A | 3/1988 | Dedeyne et al. |
| 4,942,724 A * | 7/1990 | Diekhans et al. ............. 56/10.4 |
| 4,944,141 A | 7/1990 | Orlando et al. |
| 4,984,421 A | 1/1991 | Dreux |
| 5,036,649 A | 8/1991 | Thedford et al. |
| 5,156,219 A | 10/1992 | Schmidt et al. |
| 5,170,849 A | 12/1992 | Nikkel et al. |
| 5,197,550 A | 3/1993 | Barnard |
| 5,261,495 A | 11/1993 | Szymczak |
| 5,303,533 A | 4/1994 | Caillouet |
| 5,359,836 A | 11/1994 | Zeuner et al. |
| 5,415,586 A | 5/1995 | Hanson et al. |
| 5,463,854 A | 11/1995 | Chmielewski et al. |
| 5,535,577 A | 7/1996 | Chmielewski et al. |
| 5,653,292 A | 8/1997 | Ptacek et al. |
| 5,704,200 A | 1/1998 | Chmielewski et al. |
| 5,978,720 A * | 11/1999 | Hieronymus et al. ........ 701/31.4 |
| 6,068,059 A | 5/2000 | Bajema et al. |
| 6,164,385 A | 12/2000 | Buchl |
| 6,378,281 B1 | 4/2002 | Ottaway |
| 6,594,978 B2 | 7/2003 | Viaud |
| 6,701,857 B1 | 3/2004 | Jensen et al. |
| 6,826,894 B2 * | 12/2004 | Thiemann ............ A01D 41/141 56/10.2 E |
| 6,883,299 B1 | 4/2005 | Gramm |
| 6,971,452 B2 | 12/2005 | Ocsenknecht et al. |
| 7,055,616 B1 | 6/2006 | Kiel |
| 7,395,650 B2 | 7/2008 | Mossman et al. |
| 7,401,455 B1 | 7/2008 | Cleodolphi |
| 8,275,627 B2 | 9/2012 | Henning et al. |
| 2009/0313962 A1 * | 12/2009 | Talbi .......................... 56/10.2 R |

OTHER PUBLICATIONS

Amity Technology, Operating Manual 2009 WIC Harvester 12 Row, 2009, Fargo, ND (89 pages).
Amity Technology, Parts Manual 2009 WIC Harvester 12 Row 22-scrub, 2009, Fargo, ND (133 pages).
Amity Technology, Operating Manual 2009 WIC Harvester (6 and 8 Row), 2009, Fargo, ND (95 pages).
Amity Technology, Parts Manual 2009 WIC Harvester 6 Row 22-scrub, 2009, Fargo, ND (145 pages).
Amity Technology, Parts Manual 2009 WIC Harvester 8 Row 22-scrub, 2009, Fargo, ND (149 pages).

* cited by examiner

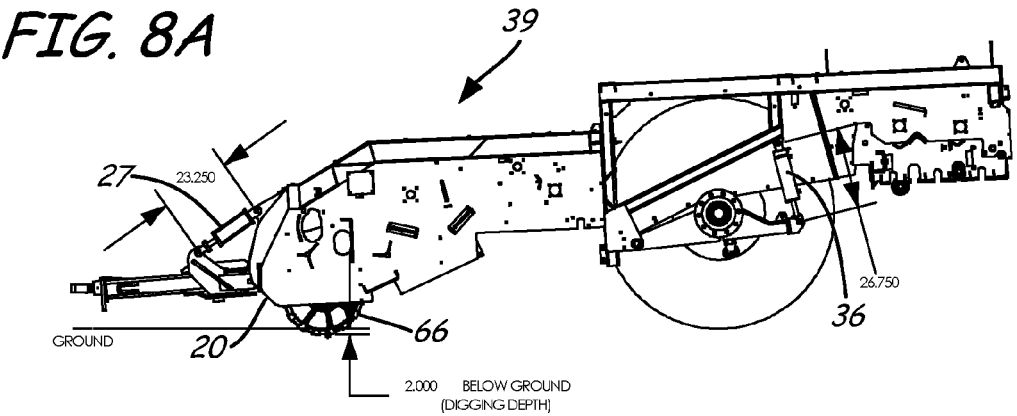
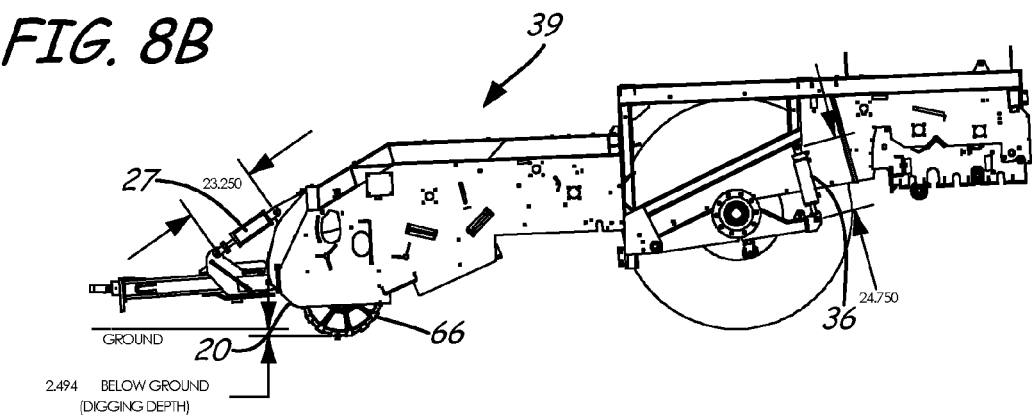
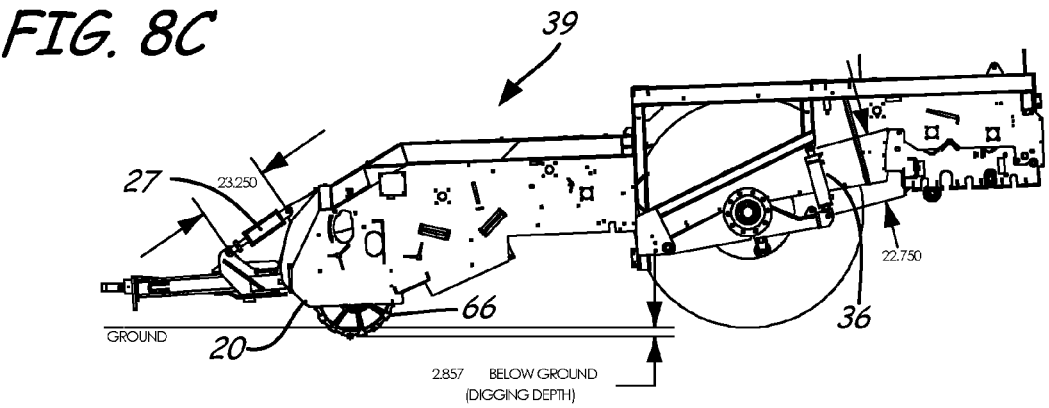

HARVESTER WITH AUTOMATIC DEPTH AND LEVEL CONTROL

CROSS-REFERENCE TO RELATED APPLICATION

This application is a divisional of and claims priority to U.S. patent application Ser. No. 13/273,582, filed Oct. 14, 2011, now U.S. Pat. No. 8,943,788, which is a non-provisional of and claims priority to U.S. Provisional Patent Application Ser. No. 61/455,043, filed Oct. 14, 2010, which are hereby incorporated by reference in their entirety.

BACKGROUND

Agricultural implements such as harvesters generally have a crop harvesting assembly that feeds harvested crops onto a receiving assembly. In sugar beet harvesting, the crop harvesting assembly is generally configured as a line of digger wheels, the line oriented transverse to the direction of travel. Crops harvested by the line of digger wheels are typically fed onto a receiving assembly such as a grab roll assembly. The crops are then typically conveyed by a boom to a depository such as a truck or trailer bin traveling alongside the harvester.

While height control systems are known for keeping a crop harvesting assembly at a consistent height relative to the ground surface, such systems are not suitable for harvesting crops from under the ground surface and are not adequate for optimal harvesting on uneven terrain. In this description, the term "uneven" generally refers to a ground surface that is not horizontal in a direction transverse to the direction of travel, but may also include the situation where portions of the terrain are softer or harder than adjacent portions. In many instances, an uneven ground surface generally slopes in one primary direction. In the cultivation of root crops such as beets, a crop harvesting assembly typically digs into the ground at a particular depth, such as between about 2 to 4 inches under the ground surface, to pull up the crops. When digging into an uneven ground surface, one end of the line of digger wheels may dig too deeply and the other end may not dig deeply enough. On the end that digs too deeply, an excessive amount of dirt, clods and mud is pulled up by the digger wheels, thereby leading to increased clogging and downtime for cleaning and maintenance. Moreover, excess tare leads to decreased productivity. On the end that digs too shallowly, the wheels do not dig deeply enough to effectively harvest the in-ground crops.

SUMMARY

In one aspect, the disclosure describes an apparatus that harvests crops as the apparatus moves in a direction of travel across a field. The apparatus comprises a crop harvesting assembly configured as a line of implements, the line being transverse to the direction of travel. First and second devices for adjusting a vertical position of left and right sides of the apparatus, respectively, are independently operable. Adjustment of a vertical position of at least one of the left and right sides of the apparatus results in tilting the line of implements relative to a horizontal plane defined at a ground surface under left and right ground contacting elements.

In another aspect, a method is disclosed for automatically positioning a line of implements of an apparatus to follow a ground surface proximate the line of implements as the apparatus moves in a direction of travel across the ground surface, the line of implements being positioned transverse to a direction of travel of the apparatus. The method comprises obtaining a first distance between a left reference point of the apparatus and the ground surface and relaying the first distance to a computer, obtaining a second distance between a right reference point of the apparatus and the ground surface and relaying the second distance to a computer, and using the computer to automatically actuate at least one of the left and right devices to vertically move at least one of the left and right sides of the apparatus, respectively, thereby reducing a difference between the first distance and the second distance.

In yet another aspect, a system comprises a computer and a user interface through which a human operator receives information from the computer and issues commands to the computer. The system also comprises an apparatus that comprises a crop harvesting assembly configured as a line of implements, the line being transverse to the direction of travel; a left ground contacting element; a first device for adjusting a vertical position of a left side of the apparatus; a right ground contacting element; and a second device for adjusting a vertical position of a right side of the apparatus, wherein the first and second devices are independently operable, and wherein adjustment of a vertical position of at least one of the left and right sides of the apparatus results in tilting the line of implements relative to a horizontal plane defined at a ground surface under the left and right ground contacting elements. The system further comprises a first sensor that relays information pertaining to a first distance between a left reference point of the line of implements and the ground surface and a second sensor that relays information pertaining to a second distance between a right reference point of the line of implements and the ground surface. The computer automatically actuates at least one of the left and right devices to vertically move at least one of the left and right sides of the apparatus, respectively, thereby reducing a difference between the first distance and the second distance. Information pertaining to the automatic actuation is relayed to the operator through the user interface.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

FIG. 8A is a side elevation view of the lower frame of the harvester of FIG. 1 with an axle hydraulic cylinder extended four inches.

FIG. 8B is a side elevation view of the lower frame of the harvester of FIG. 1 with the axle hydraulic cylinder extended two inches.

FIG. 8C is a side elevation view of the lower frame of the harvester of FIG. 1 with the axle hydraulic cylinder fully retracted.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

DETAILED DESCRIPTION

Figure 1:
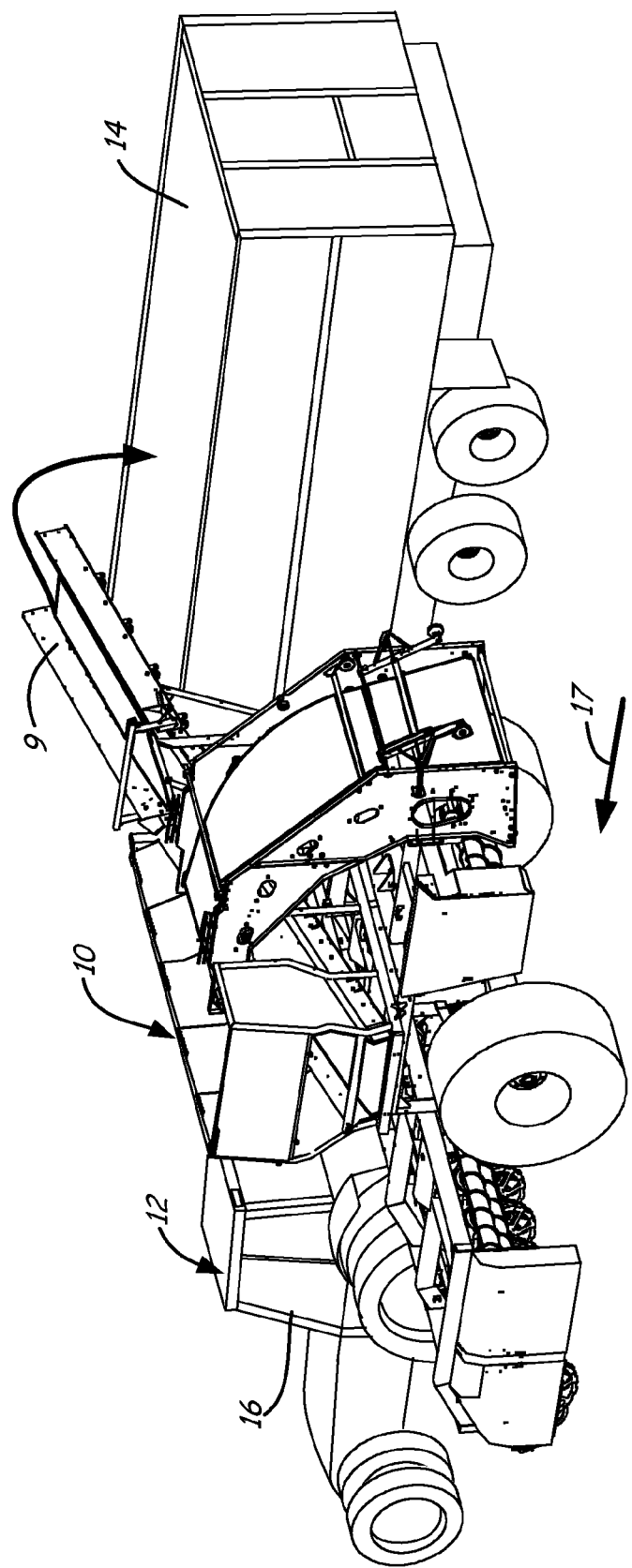
FIG. 1 is a rear perspective view of an exemplary harvester being towed by a tractor and depositing the harvested crop in a truck bin that is traveling alongside the harvester.

FIG. 1 is a rear perspective view of a sugar beet harvester 10 being towed by a tractor 12 and depositing the harvested sugar beets via a conveyor boom 9 into a bin 14 of a truck or trailer. An operator controls various operations of the harvester 10 through electronic and hydraulic control lines, or by wireless means, from cab 16 of tractor 12. The harvester 10, tractor 12, and bin 14 are all traveling in a common direction of travel 17 across a field of crops to be harvested.

Figure 2:
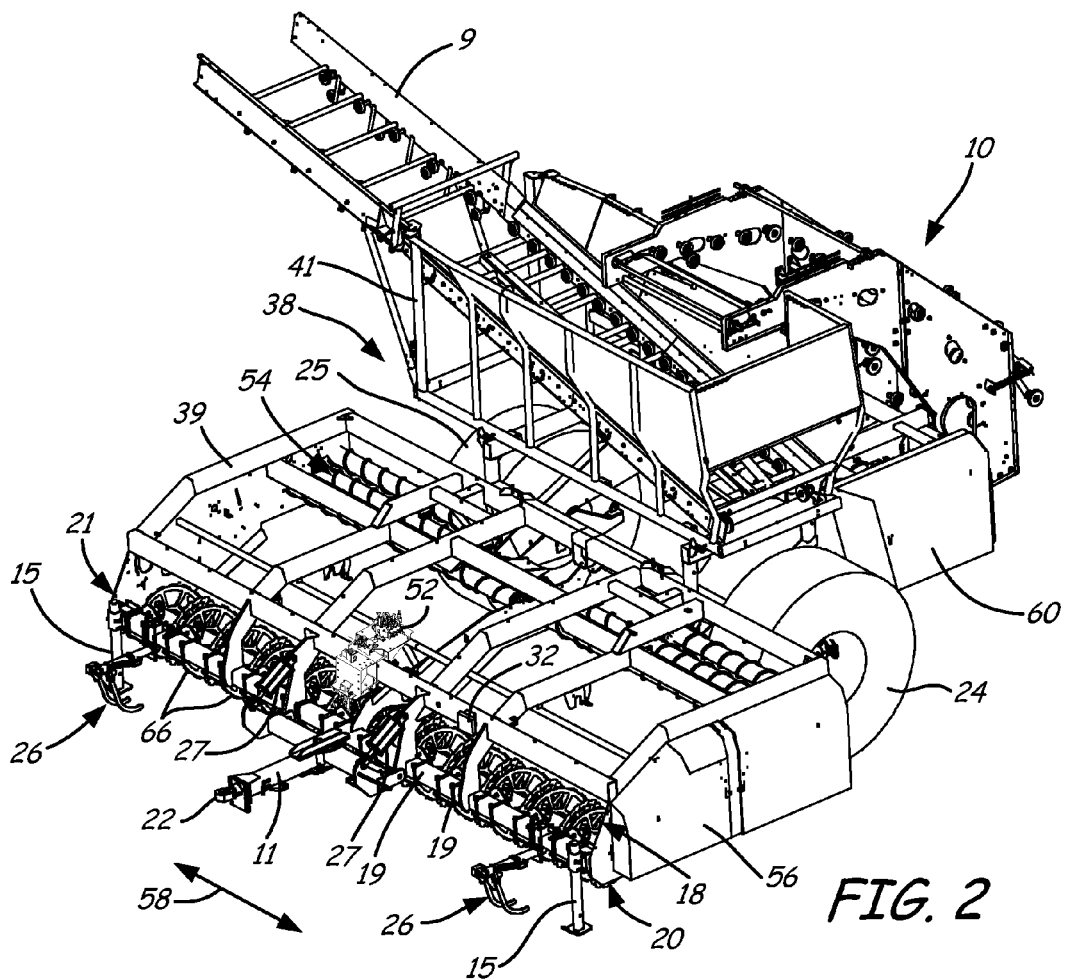
FIG. 2 is a front perspective view of the harvester of FIG. 1, detached from the tractor and resting on foot pads.
Figure 3:
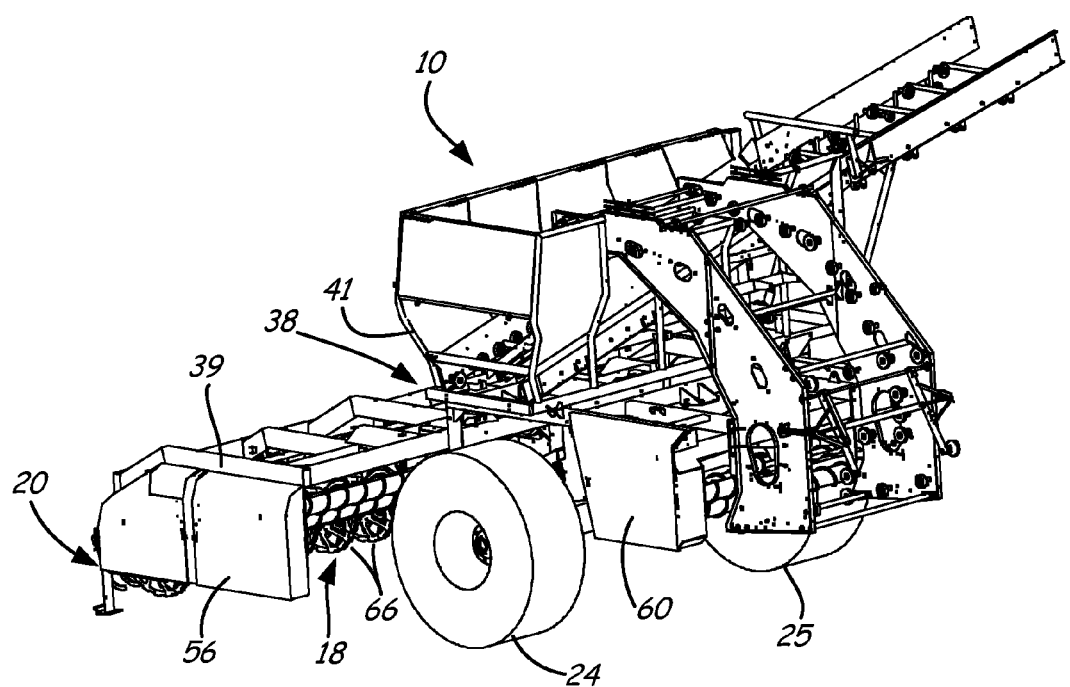
FIG. 3 is a rear perspective view of the harvester of FIG. 2.

FIG. 2 and FIG. 3 are front and rear perspective views, respectively, of harvester 10. An exemplary harvester 10 is available from Amity Technology of Fargo, N. Dak., as Sugar Beet Harvester Model No. 2700. In FIGS. 1-3, the conveyor chains, meshes and paddle shafts of harvester 10 are not shown (or the conveyor chains are represented as a solid surface in FIG. 1) for clarity of the illustration. In an exemplary embodiment, a crop harvesting assembly is configured as a line of implements, such as digger wheels. For example, in the illustrated embodiment, a line of digger wheels 18 is disposed near a front frame bar 19 of harvester 10. The line of digger wheels is transverse to the direction of travel 17 (FIG. 1). While FIG. 2 shows the front frame bar 19 of harvester 10 resting on foot pads 15 at left and right corners 20, 21 respectively (from the perspective of the forward-facing tractor operator), it is to be understood that while in use, the front of harvester 10 is centrally supported by tongue 11 via coupler 22 on a hitch of tractor 12. A rear of harvester 10 is supported on the ground by left and right ground contacting elements that are left and right carrying wheels 24, 25, respectively, in an exemplary embodiment.

Extendable and retractable devices such as hydraulic hitch cylinders 27 are disposed near front frame bar 19 for raising and lowering the line of digger wheels 18. In an exemplary embodiment, two hydraulic hitch cylinders 27 are disposed near a center of front frame bar 19 and are commonly plumbed so that they are actuated for simultaneous movement.

Frame 38 of harvester 10 consists of lower frame 39 and upper frame 41. Lower frame 39 of a 12-row harvester further consists of forward portion 56 and rear portion 60. In an exemplary harvester, a lateral width of forward portion 56 of lower frame 39 can be up to about 24 feet. In an exemplary embodiment, a front-to-back distance between the line of digger wheels 18 and the left and right carrying wheels 24, 25 can be about 10 to about 15 feet. Accordingly, the ground contour under the line of digger wheels 18 can be different enough from the contour under the carrying wheels 24, 25 to require tilting of lower frame 39 to maintain the line of digger wheels 18 at a desired degree of levelness with respect to the ground. This is particularly true where the harvester 10 is towed through an area of significant ground contour change, such as the edge of the ditch.

Figure 4:
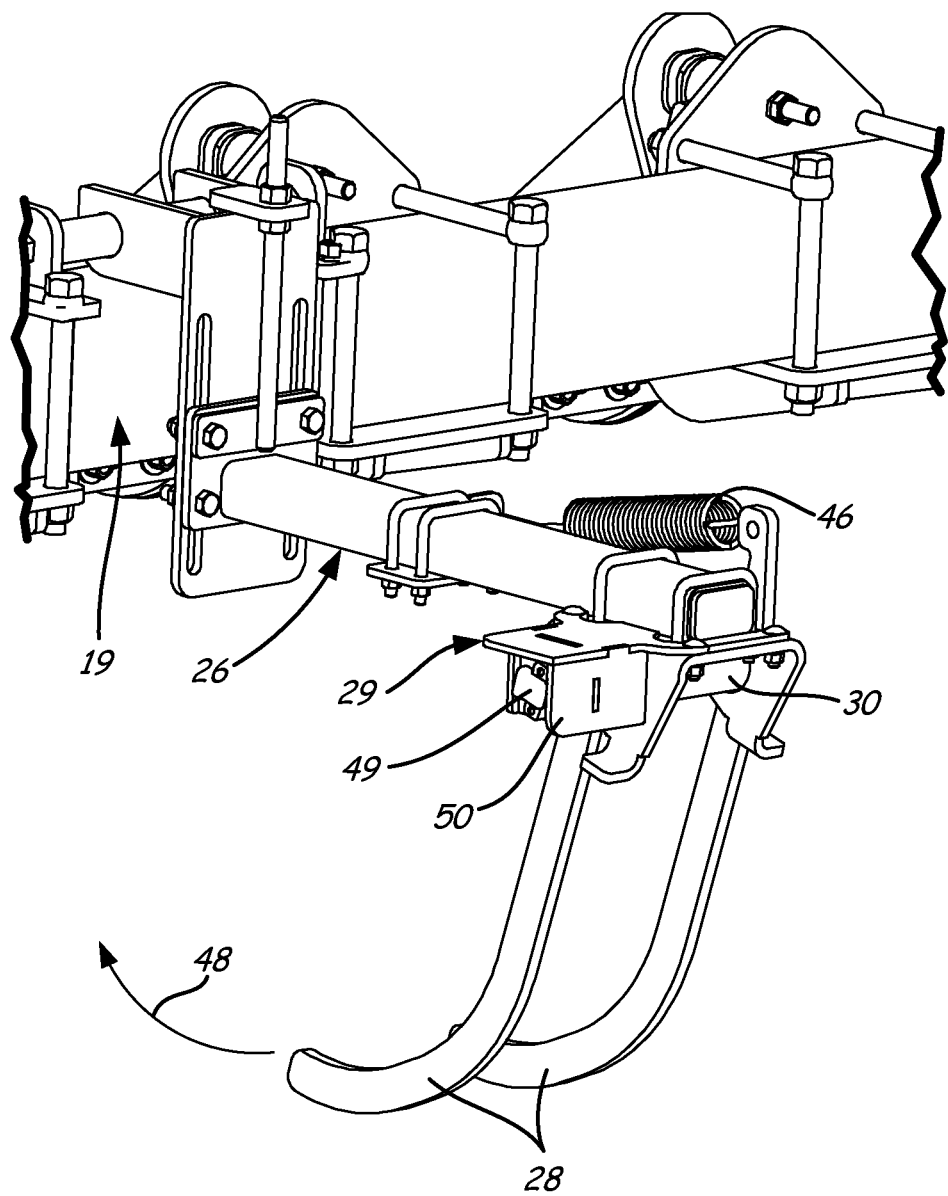
FIG. 4 is a perspective view of an exemplary ground contacting sensor arm assembly attached to a front of the harvester.

As shown in FIGS. 2 and 4, a ground contacting sensor arm assembly 26 is attached to front frame bar 19 near each corner 20, 21. Each pair of ground contacting sensor arms (also called wands) 28 is pivotally mounted to weldment 29 at axle 30. Each ground contacting sensor arm assembly 26 includes spring 46 to bias the sensor arms 28 in a forward position relative to direction of travel 17. Of course, the ground surface is not always horizontal, and is often uneven. A raised ground surface causes the arm 28 to rotate in direction 48 about axle 30. This rotation is sensed by a sensor 49 inside sensor housing 50. In an exemplary embodiment, sensor 49 employs a rotary potentiometer and depth information is then conveyed to a computer 32. In an exemplary embodiment, the two sensor arms 28 of a single sensor arm assembly 26 are coupled together, and thus move together to register the highest ground surface level encountered by either of the sensor arms 28.

Computer 32 includes a controller and associated circuitry to control electrical and hydraulic lines (not shown) in response to an operator's commands or settings or feedback from sensors 49. In an exemplary embodiment, the user interface is an operator display/control assembly 33 having a graphical touch-screen interface 34 (shown in FIG. 5) located in cab 16. Hydraulic lines (not shown) connect hydraulic modulated valve 52 and hydraulic hitch cylinders 27 to control the vertical placement of the row digger wheels 18. Hydraulic lines also connect hydraulic modulated valve 52 and hydraulic cylinders 36 (shown in FIGS. 7-10), which control the side-to-side tilt of harvester 10 at actuation point 40 (left and right actuation points 40 are mirror images of each other).

A first adjustment device such as a left axle hydraulic cylinder 36 is disposed at left carrying wheel 24 and contacts rear portion 60 of harvester lower frame 39 at left actuation point 40. A second adjustment device such as a right axle hydraulic cylinder 36 is disposed at right carrying wheel 25 and contacts rear portion 60 of harvester lower frame 39 at right actuation point 40. Actuation of left axle hydraulic cylinder 36 to extend or retract the cylinder 36 raises and lowers the left side of harvester 10 at left actuation point 40. Actuation of right axle hydraulic cylinder 36 to extend or retract the cylinder 36 raises and lowers the right side of harvester 10 at right actuation point 40. The front end of harvester 10 remains centrally supported on the tractor hitch at coupler 22 (shown in FIG. 2). Accordingly, when the stroke of one of hydraulic cylinders 36, 36 is changed (or when the strokes of the hydraulic cylinders 36 are changed in unequal amounts), harvester lower frame 39 tilts in response to the lifting or lowering of one or both sides of the lower frame 39.

Crops harvested by the crop harvesting assembly, such as the line of digger wheels 18, are then fed to the receiving assembly, such as a grab roll assembly 54 (shown in FIG. 2). A known grab roll assembly is described in U.S. Pat. No. 5,197,550, which is incorporated herein by reference. In an exemplary embodiment, the entire harvester lower frame 39 is tilted and not just the line of digger wheels 18, and thus there is no relative positional change between the line of digger wheels 18 and the grab roll assembly 54. Accordingly, no extra gaps or spaces are created into which the harvested crops could fall. This results in a system that follows the ground contour without sacrificing crop yield or system operation reliability. While hydraulic cylinders 36 are illustrated as being located proximate the axles of carrying wheels 24, 25 in an exemplary embodiment, in other embodiments, left and right actuation points to which hydraulic cylinders 36 contact the harvester frame may be otherwise located. In one example, hydraulic cylinders 36 are positioned on the left and right sides of a forward frame portion 56 that is allowed to tilt or roll with respect to the rear frame portion 60 about a horizontal, longitudinal axis of the lower frame 39.

As noted above, in use the forward end of lower frame 39 is supported by tongue 11 via coupler 22 and a hitch of tractor 12. While left and right carrying wheels 24, 25 automatically follow the ground contour underneath the wheels 24, 25, the line of digger wheels 18 is located significantly forward of the left and right carrying wheels 24, 25. Accordingly, actuation of hydraulic cylinders 36 at actuation points 40 allows for correction of the tilt of the line of digger wheels 18 to conform to the uneven terrain sensed at the forward end of lower frame 39 by ground contacting sensor arm assemblies 26 located near front corners 20, 21.

In an exemplary embodiment, the forward portion 56 of the lower frame 39 is articulated with respect to the tractor 12 hitch to allow for transverse movements in directions 58. Such transverse movement is often used in conjunction with a row-finder system so that digger wheels 66 of the line of digger wheels 18 reliably engage the planted rows of crops even if direction of travel 17 is not exactly aligned with the crop rows. A known row-finder system is described in U.S. Pat. No. 4,616,712, which is hereby incorporated by reference.

Computer 32 controls the hydraulic cylinders 27 to control the vertical position of the line of digger wheels 18 at the operator's selected depth and also controls the hydraulic cylinders 36 at each carrying wheel 24, 25 to tilt the entire harvester 10 to compensate for side-to-side variation in ground level as harvester 10 is towed across the ground surface (i.e., uneven terrain). Actuation of the hydraulic cylinders 27, 36 may be accomplished manually by an operator through graphical user interface 34 or automatically by computer 32 in accordance with settings selected by the operator through graphical user interface 34 and feedback received from the ground contacting sensor arm assemblies 26. For example, if the ground contacting sensor arm assemblies 26 sense that there is more ground clearance near left corner 20 than near right corner 21, then computer 32 will send signals to hydraulic modulated valve 52 to either raise the harvester lower frame 39 at right actuation point 40 or lower the harvester lower frame 39 at left actuation point 40 (or both) to keep the line of digger wheels 18 level with respect to the ground. Thus, the depth control and level control of the system result in automatic, active, and continuous ground contour following of the line of digger wheels 18 with respect to the ground.

In an exemplary embodiment, a single hydraulic line connects hydraulic modulated valve 52 to both of hydraulic hitch cylinders 27, which operate in parallel to control the vertical location of the row of digger wheels 18. A second hydraulic line connects hydraulic modulated valve 52 to left axle hydraulic cylinder 36 at left actuation point 40. A third hydraulic line connects hydraulic modulated valve 52 to right axle hydraulic cylinder 36 at right actuation point 40. Because the left and right axle hydraulic cylinders 36 are independently operable, the system is very responsive to both automatic and manual user control to tilt lower frame 39 in order to allow the line of digger wheels 18 to closely follow the ground contour. Because the left and right axle hydraulic cylinders 36 are plumbed independently, they can be independently actuated to extend or retract, without the need for using a manual jack or a physical stop member. In an exemplary embodiment, hydraulic valve 52 is expandable and can connect other hydraulic lines for additional functions (e.g., for use in connection with a row-finder).

Software controlled by computer 32 calculates the desired extension or retraction of each hydraulic cylinder 27, 36 to automatically adjust their positions, taking into account the ground contour sensed by the ground contacting sensor arm assemblies 26, as well as the geometry of the harvester 10, including the location of the line of digger wheels 18 with respect to the location of the left and right actuation points 40.

This allows for on-the-go adjustment rendered either manually by a user through the graphical user interface 34 or automatically by the controller of computer 32. It is contemplated that other user interfaces and controls can also be used, including but not limited to control levers, joysticks, keypads, and buttons, for example. The constant feedback from the ground contacting sensor arm assemblies 26 as harvester 10 moves across the uneven terrain allows for continuous adjustment of both the depth of the line of digger wheels 18 (by the actuation of hydraulic hitch cylinders 27) and the levelness of the line of digger wheels 18 (by tilting the lower frame 39 via actuation of the left and/or right axle hydraulic cylinders 36).

Automatic control of depth and levelness, as offered by the system of the present disclosure, is particularly advantageous because harvester 10 is towed behind a tractor 12 in which an operator is seated. Accordingly, manual adjustment of the levelness of the line of digger wheels 18 in response to changes in ground contour by an operator is very difficult to accomplish accurately because the line of digger wheels 18 is behind the user and therefore not easily visible. The automatic computer control takes operator guesswork and error out of the operation, resulting in more accurate and consistent ground contour following, increased equipment performance, reduced tare, and reduced operator fatigue.

Figure 6A:
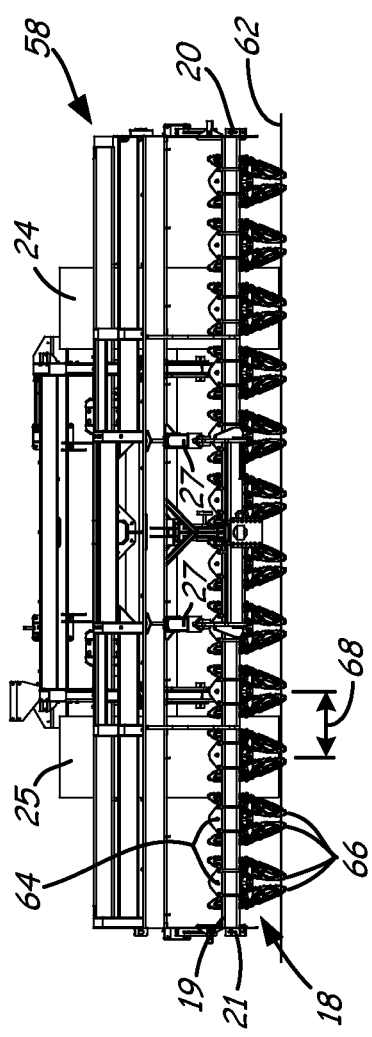
FIG. 6A is a front elevation view of a front portion of the harvester of FIG. 1 in a configuration that is level with the ground surface.

FIG. 6A is a front elevation view of forward portion 58 of harvester 10 in a configuration that is level with ground surface 62. The illustrated harvester 10 is a 12-row harvester having twelve lifter struts 64; each lifter strut 64 is attached to front frame bar 19 and carries an implement such as a pair of digger wheels 66. Each pair of digger wheels harvests a row of crops. Digger wheels 66 are also referred to as lifter wheels because they dig into the ground surface to lift the crops upward from the ground. In an exemplary embodiment, alignment of the line of implements is defined by the orientation of front frame bar 19, to which the lifter struts 64 are attached.

In an exemplary installation, ground contacting sensor arm assemblies 26 (shown in FIGS. 2 and 4) are attached to front frame bar 19 so that the two sensor arms 28 of a single assembly 26 are equidistant from the center point between the two digger wheels 66 of a single lifter strut 64. A typical distance between the two sensor arms 28 of a single assembly 26 is about 7 to 8 inches. This placement allows the two sensor arms 28 to contact the ground surface 62 along both sides of a row of crops to be harvested. In another embodiment, each ground contacting sensor arm assembly 26 may have a single sensor arm 28. In still other embodiments, a distance sensor between a reference point of the apparatus and the ground surface need not have a physical ground contacting member may be instead use optical, radio frequency, or other distance sensing technologies.

A distance 68 between adjacent rows is typically approximately 22 inches. Thus, a distance between "Row 1" (on the left in the illustration of FIGS. 6A and 6B) and "Row 12" (on the right in the illustration of FIGS. 6A and 6B) is typically about 20 feet. When two ground contacting sensor arm assemblies 26 are used, they are placed at "Row 2" and "Row 11" in an exemplary embodiment. In this case, the two contacting sensor arm assemblies 26 are far enough apart to accurately sense unevenness in the terrain proximate the line of digger wheels 18 but close enough together to mediate extremes in terrain at the ends of the line of digger wheels 18. In some cases, interference with the tires of the towing tractor 12 may necessitate the placement of contacting sensor arm assemblies 26 in alternate transverse positions, such as at "Row 1" and "Row 12." In an exemplary embodiment, a left ground contacting sensor arm assembly 26 senses a first distance between a left reference point of the apparatus and the ground surface and relays the first distance to computer 32. Similarly, a right ground contacting sensor arm assembly 26 senses a second distance between a right reference point of the apparatus and the ground surface and relays the second distance to computer 32. Computer 32 automatically actuates at least one of the left and right hydraulic cylinders 36 to vertically move at least one of the left and right sides of the harvester 10, respectively, thereby reducing a difference between the first and second distances. In an exemplary embodiment, wand 28 of each ground contacting sensor arm assembly 26 travels on the ground surface while the bottoms of the digger wheels 66 are located below the ground surface. Thus, when computer 32 relies on input from the ground contacting sensor arm assemblies 26 to control a target depth of the digger wheels 66, appropriate calculations are made to correlate the sensed physical parameters with the desired implement reference points.

Figure 6B:
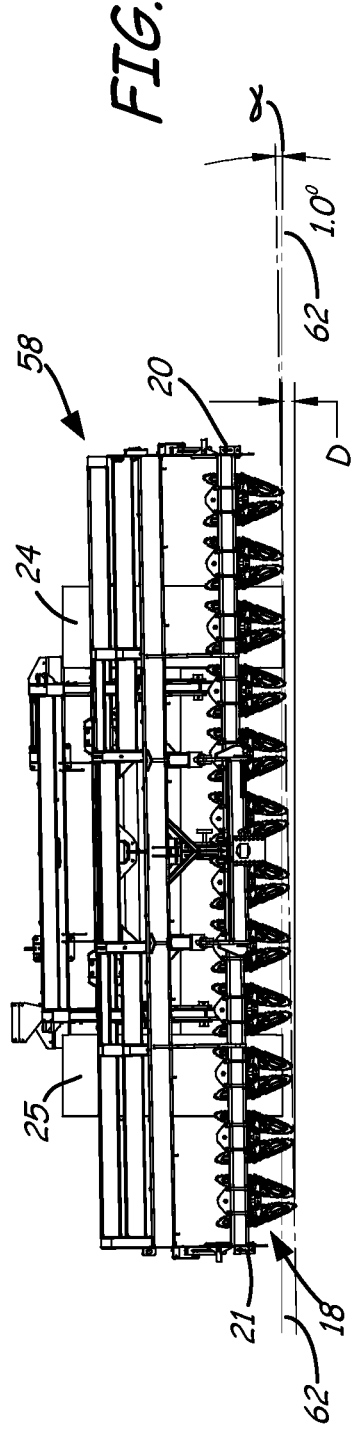
FIG. 6B is a front elevation view of a front portion of the harvester of FIG. 1 in a configuration that is tilted with respect to the ground surface.

As shown in FIG. 6A, carrying wheels 24 and 25 roll upon ground surface 62 while the bottoms of digger wheels 66 are slightly below ground surface 62. This is a standard configuration during harvesting when the left and right cylinders 36 are evenly implemented. FIG. 6B is a front elevation view of a front portion 56 of the harvester 10 in a configuration that is tilted with respect to the ground surface 62. The illustration of FIG. 6B shows that while left and right carrying wheels 24, 25 roll along the ground surface 62, the bottoms of the digger wheels 66 in the line of digger wheels 18 are tilted with respect to the ground surface 62. While a tilt in one direction is illustrated in FIG. 6B, it is to be understood that a tilt in the opposite direction is also achieved by the disclosed apparatus. In the illustrated embodiment, the angle of tilt (alpha) of the line of digger wheels 18 is about one radial degree. Across the width of the line of digger wheels 18, the vertical difference D between the lowest point and the highest point is about 4.5 inches for the 12-row harvester 10. Because an 8-row harvester is not as wide as a 12-row harvester, the one radial degree tilt corresponds to a vertical difference between the lowest point and the highest point of about three inches. The amount of tilt is determined at least in part by the stroke length of the left and right cylinders 36; the geometry of the harvester lower frame 39; and the connection configurations and angles of the axle cylinders 36. In an exemplary embodiment, the maximum stroke length of each of the hydraulic hitch cylinders 27 is about ten inches. In an exemplary embodiment, the maximum stroke length of each of the left and right axle hydraulic cylinders 36 is about ten inches. The one radial degree of tilt has been found to be sufficient to allow the line of digger wheels 18 to accurately follow the ground contour under most conditions while maintaining safety.

Because boom 9 is typically located on the right side of harvester 10 (as shown in FIGS. 1-3), the right side of harvester 10 is usually heavier than the left side. Accordingly, the right carrying wheel 25 usually sinks into the ground surface more than the left carrying wheel 24. Thus, even on relatively level terrain, right axle hydraulic cylinder 36 will usually be extended more than left axle hydraulic cylinder 36 so that right corner 21 is lifted with respect to left corner 20, to compensate for the sinking of right carrying wheel 25 into the ground.

Figure 7:
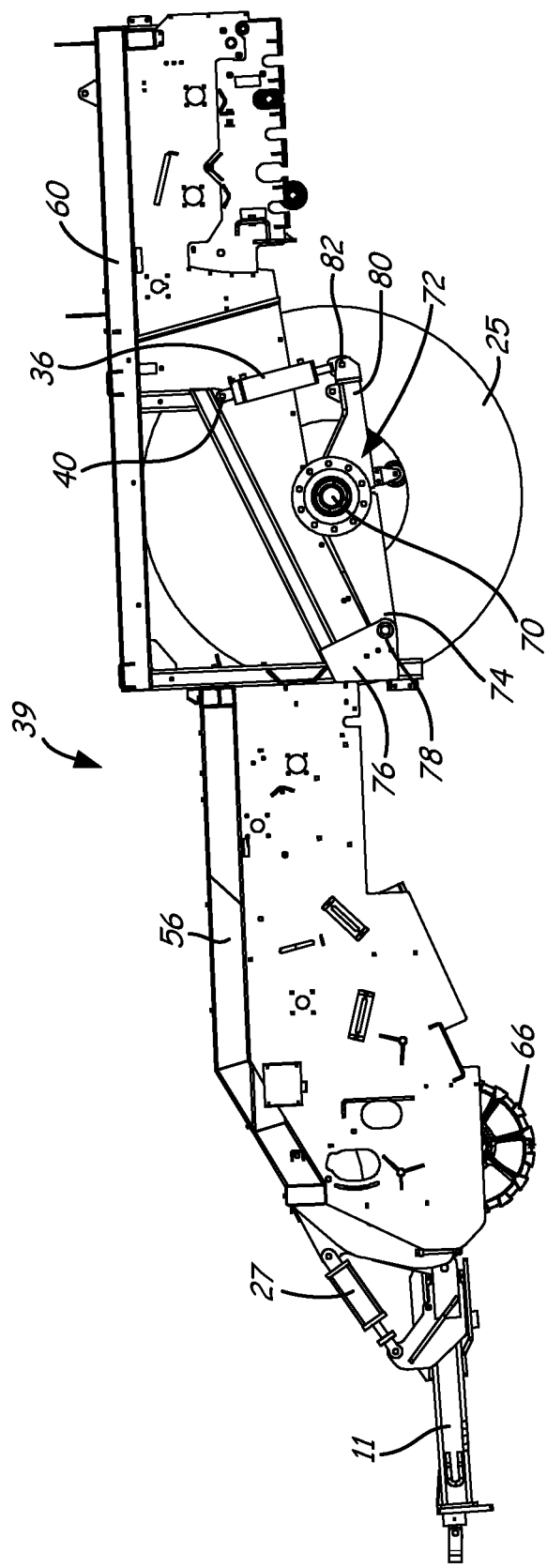
FIG. 7 is a side elevation view of the lower frame of the harvester of FIG. 1, showing the support arms for the carrying wheels of an exemplary 12-row harvester, with the left carrying wheel removed for illustrative purposes.

FIG. 7 is a side elevation view of the lower frame 39 of harvester 10 (in a 12-row configuration). In this view, left carrying wheel 24 has been removed so that the connections between the left carrying wheel 24 and the rear portion 60 of lower frame 39 are visible. An inside of right carrying wheel 25 is visible in FIG. 7. In use, left carrying wheel 24 would be mounted on hub 70 of axle carrying member 72. First end 74 of axle carrying member 72 is pivotally attached to rear frame portion 60 at bracket 76 having pivot point 78. Second end 80 of axle carrying member 72 is pivotally attached to left axle hydraulic cylinder 36 at pivot point 82. When left axle hydraulic cylinder 36 extends and retracts, rear frame portion 60 raises and lowers at a pivotal connection between left axle hydraulic cylinder 36 and rear frame portion 60 at left actuation point 40. Because forward frame portion 56 and rear frame portion 60 are solidly connected, such extension or retraction of left axle hydraulic cylinder 36 tilts the entire lower frame 39 (and the upper frame 41 that rests upon it) by moving its left side. While the left side of the harvester is described herein, it is to be understood that the right side of the harvester is similarly configured.

Figure 10:
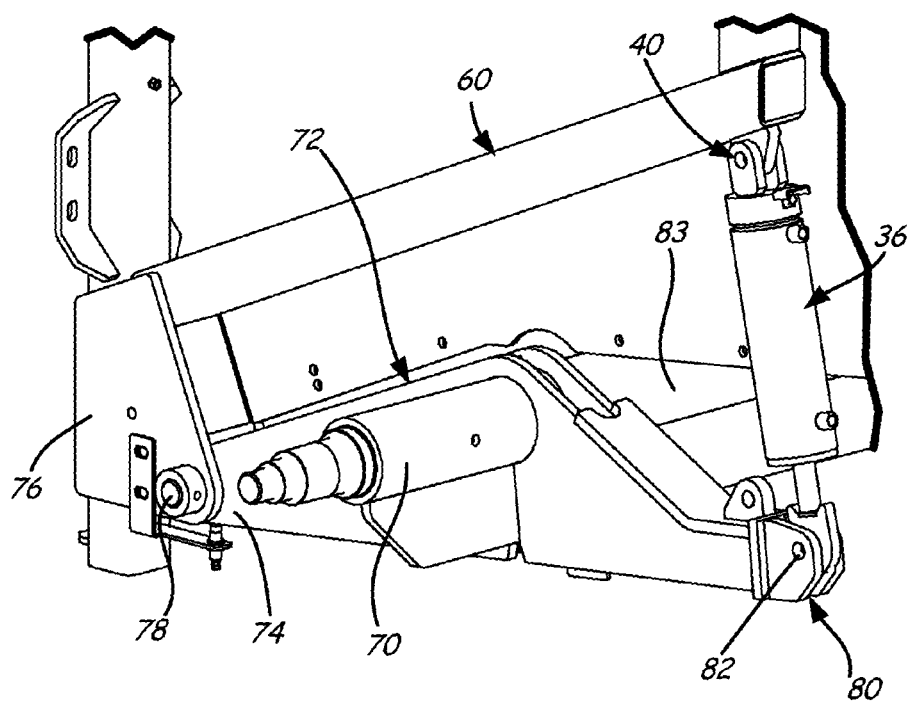
FIG. 10 is a rear perspective view of an exemplary carrying wheel support arm structure including an axle hydraulic cylinder for adjusting the vertical position of the lower frame of the harvester of FIG. 1.
Figure 12A:
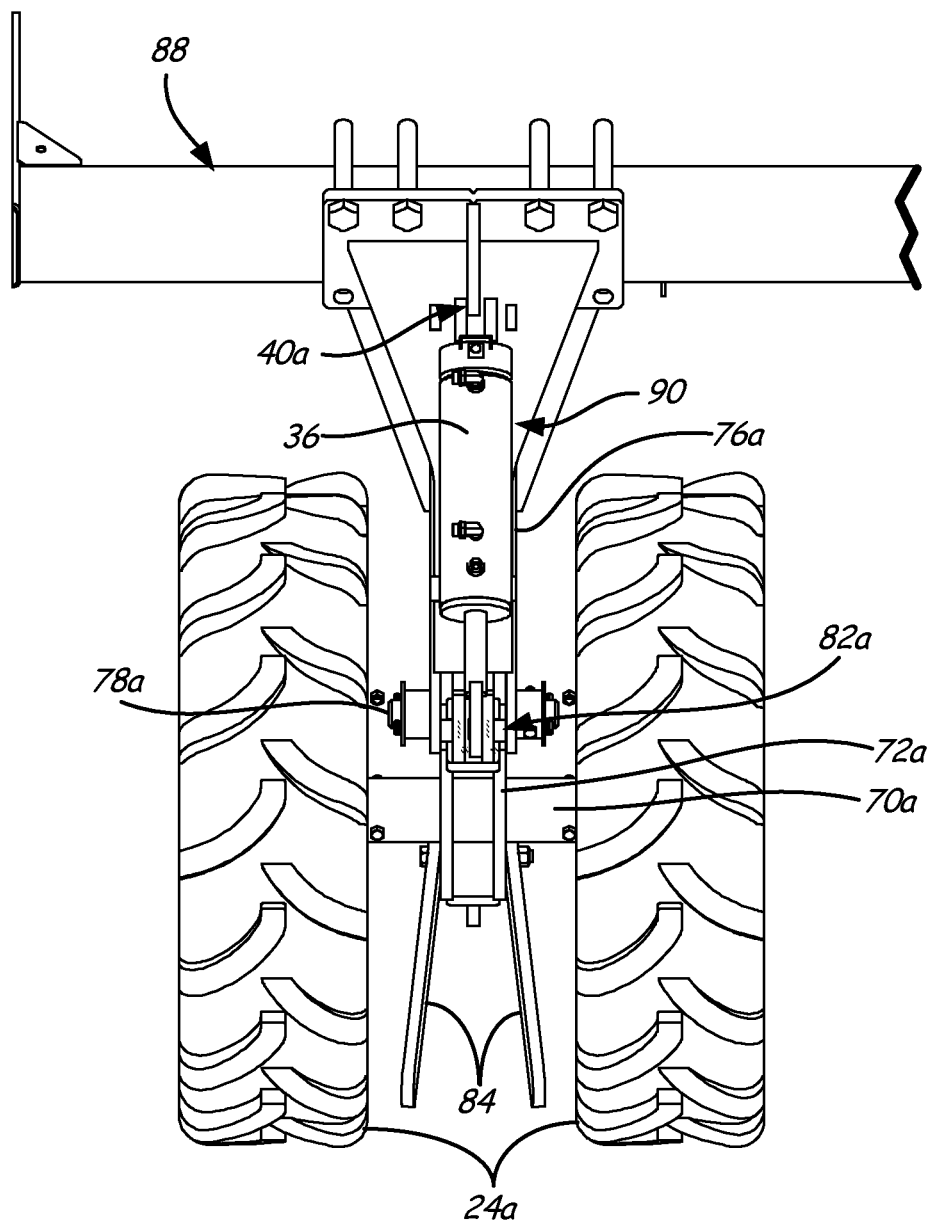
FIG. 12A is a rear top view of an exemplary carrying wheel support structure including an axle hydraulic cylinder for adjusting the vertical position of the lower frame of the harvester of FIG. 11.
Figure 12B:
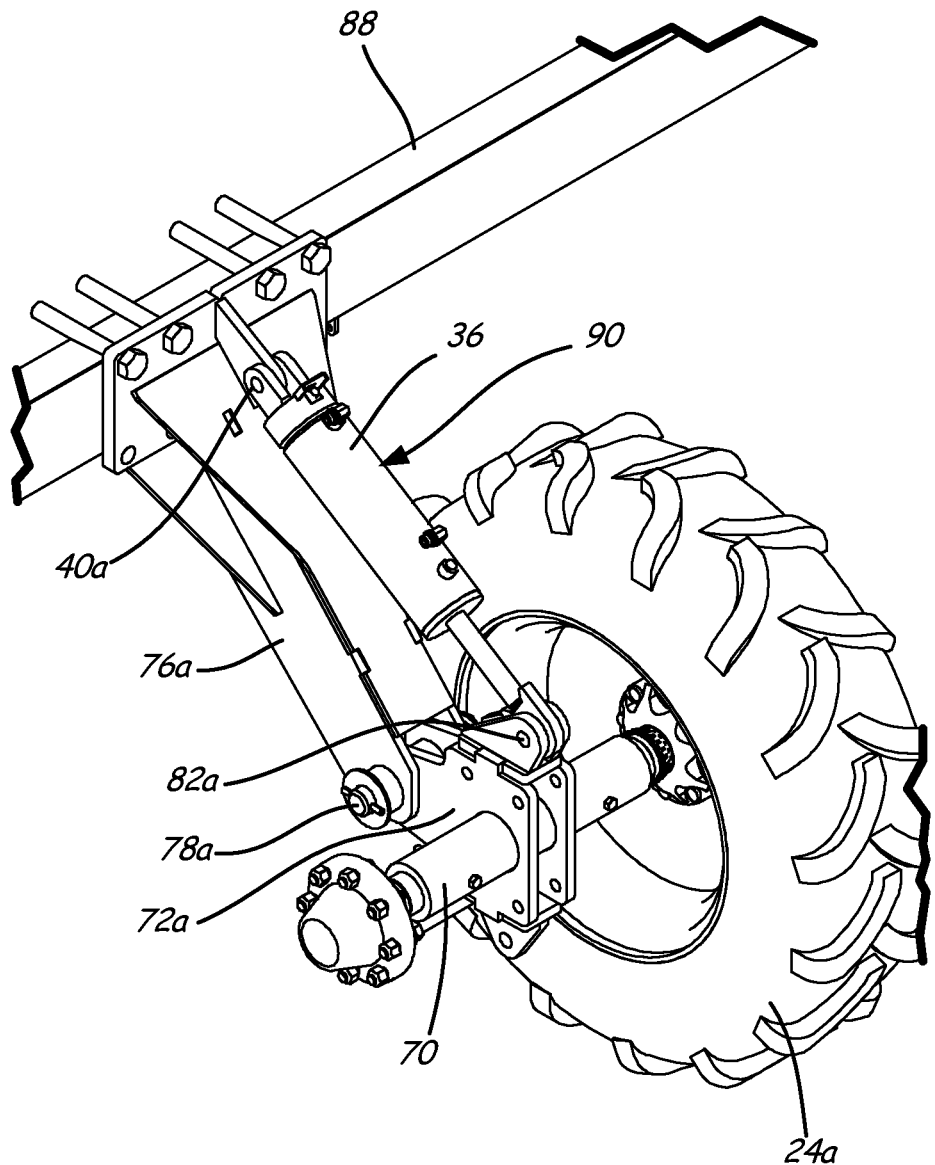
FIG. 12B is a rear perspective view of the exemplary carrying wheel support structure of FIG. 12A.

FIG. 10 further shows the components for the carrying wheel support in a 12-row harvester configuration, including the connection between left axle carrying member 72 and rear frame portion 60. Left carrying wheel 24 is removed from hub 70 for clarity of illustration. The axle carrying members 72 for the wheels 24 and 25 are yoked together by axle beam 83, which may torque slightly when the axle cylinders 36 have unequal extension settings. In a 6-row or 8-row harvester, the carrying wheels for the left and right sides of the harvester may be independently mounted (i.e., not yoked together). Such an arrangement is illustrated in FIGS. 12A-12B.

FIG. 8A is a side elevation view of the lower frame 39 with the left axle hydraulic cylinder 36 extended four inches from its retracted configuration (total cylinder length of 26.750 inches). In an exemplary embodiment of an active depth control system for a 12-row harvester, this is the maximum extension that is used to assure a generous safety factor, even though cylinder 36 has an extension capacity of ten inches. It is contemplated that a greater or lesser extension value may be chosen depending on the structure, geometry, construction, configuration and use of any suitable harvester. FIGS. 8B and 8C show left axle hydraulic cylinder 36 extended two inches (total cylinder length of 24.750 inches) and fully retracted (total cylinder length of 22.750 inches), respectively. Moving from FIG. 8C to FIG. 8B and then to FIG. 8A, left axle hydraulic cylinder 36 goes from a retracted state to an extended state. With such extension, the left side of lower frame 39 is lifted so that a bottom of digger wheels 66 near left front corner 20 raises from a digging depth of 2.86 inches in FIG. 8C to a digging depth of 2.49 inches in FIG. 8B and to a digging depth of 2.00 inches in FIG. 8A.

As illustrated in the embodiment of FIG. 8B, in the center working position, cylinder 36 is extended 2 inches. However, the center working position may be adjusted. For example, when harvesting in wet conditions, the crops will retain more dirt on them as they are dug out of the ground than in dry conditions. Accordingly, it may be desirable to increase the overall tilt of the harvester 10 from front-to-back, so that the crops travel on more of an upward incline through the harvester 10. Because of gravity, the crops will tend to travel more slowly on an upward incline, and the additional residence time on the conveyor chain surfaces allow more dirt to fall off the crops as they move through the harvester 10. To achieve such in increase in overall tilt of the harvester 10, the center working position of each of the left and right cylinders 36 may be adjusted, as detailed with reference to the Axle Cylinder Setpoint Screen 170 of FIG. 16. For example, if an initial extension of 4 inches is selected, the retracted extension shown in FIG. 8C may be at 2 inches and the maximum extension shown in FIG. 8A may be at 6 inches, for example.

Figure 9A:
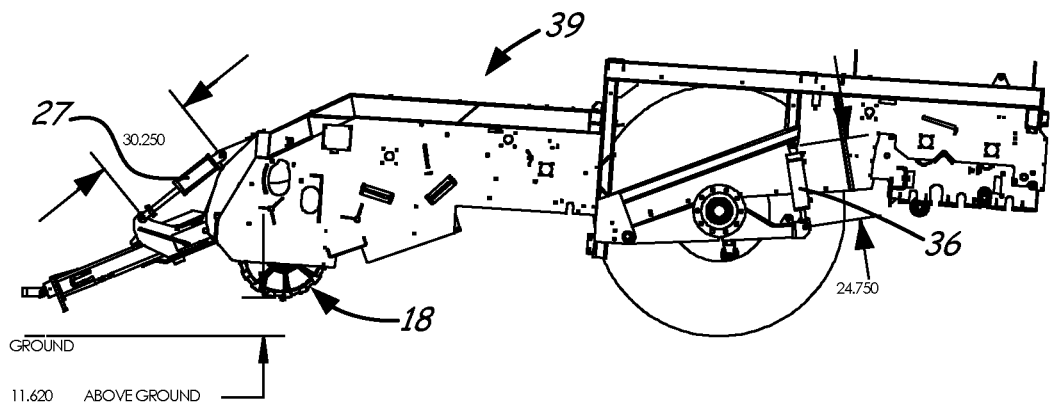
FIG. 9A is a side elevation view of the lower frame of the harvester of FIG. 1 with a hitch hydraulic cylinder fully extended.
Figure 9B:
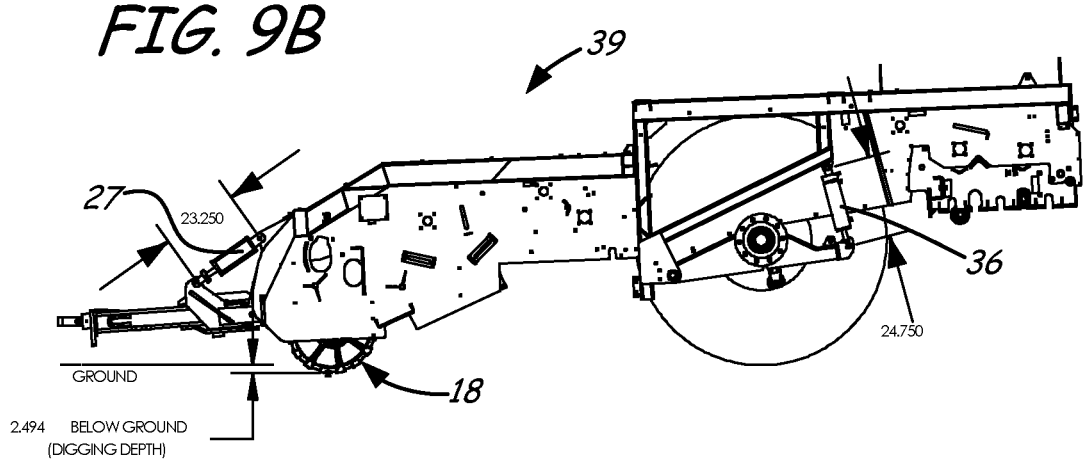
FIG. 9B is a side elevation view of the lower frame of the harvester of FIG. 1 with the hitch hydraulic cylinder extended three inches.
Figure 9C:
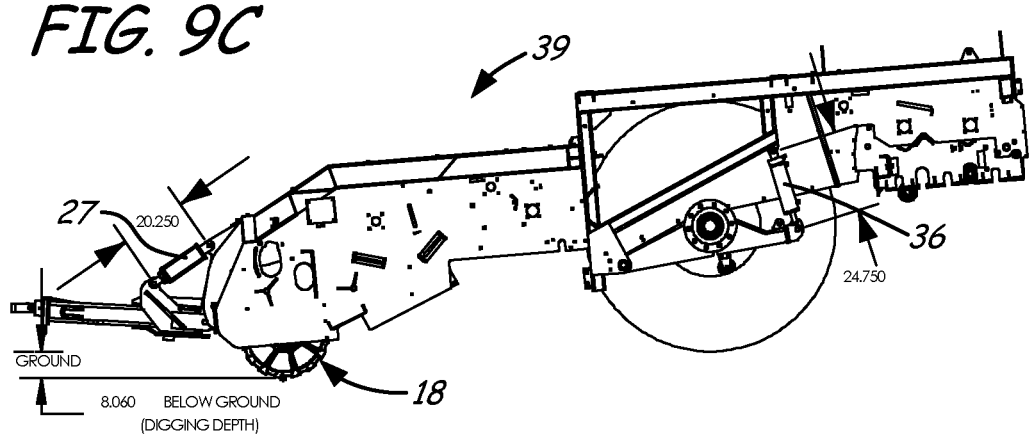
FIG. 9C is a side elevation view of the lower frame of the harvester of FIG. 1 with the hitch hydraulic cylinder fully retracted.

FIG. 9A is a side elevation view of the lower frame 39 with the hitch hydraulic cylinders 27 fully extended by 10 inches to a total cylinder length of 30.250 inches. FIG. 9B shows the hitch hydraulic cylinders 27 extended three inches and FIG. 9C shows the hitch hydraulic cylinders 27 fully retracted. In all FIGS. 9A-9C, the axle hydraulic cylinder 36 is in the two-inch extension position shown in FIG. 8B. Extension and retraction of the hitch hydraulic cylinders 27 raise and lower the line of digging wheels 18 uniformly across the line. This is in contrast to the actions of the left and right axle hydraulic cylinders 36, which each raise and lower only one end of the line of digging wheels 18. Hitch cylinders 27 in the illustrated embodiment are linked to the line of digging wheels 18 so that extension of hitch cylinders 27 results in raising the line of digging wheels 18 and retraction of hitch cylinders 27 results in lowering the line of digging wheels 18.

While example dimensions (lengths are in inches, unless otherwise indicated) are provided herein, it is to be understood that other measurements will result when the teachings used herein are applied to harvesters and components with different dimensions, designs and configurations.

FIGS. 1-3 and 6A-10 illustrate an exemplary 12-row harvester 10. The teachings disclosed herein are equally applicable to other harvesters, such as the 8-row harvester 86 of FIGS. 11-12B (only the bottom part of which is shown). Frame 88 is very similar to forward frame portion 56 of harvester 10. However, the location of the left and right actuation points 40, 40a can be chosen to distribute weight of the harvester 10, 88 in a desired manner. For example, a harvester 10 with twelve rows of digger wheels 66 will be wider in the lateral dimension and also weigh more at the forward portion 56 compared to a harvester 86 with only six or eight rows of digger wheels 66. Accordingly, for a wider harvester 10, the left and right actuation points 40 corresponding to the location of the left and right carrying wheels 24, 25, respectively, can be located relatively forward on rear portion 60 so that more of the relative weight is distributed over the carrying wheels 24, 25 rather than on the tongue 11 carried by the tractor hitch. With a narrower and therefore lighter-weight harvester 86, the left and right carrying wheels 24, 25 can be located farther back upon frame 88, with more relative weight being carried on the hitch.

Figure 11:
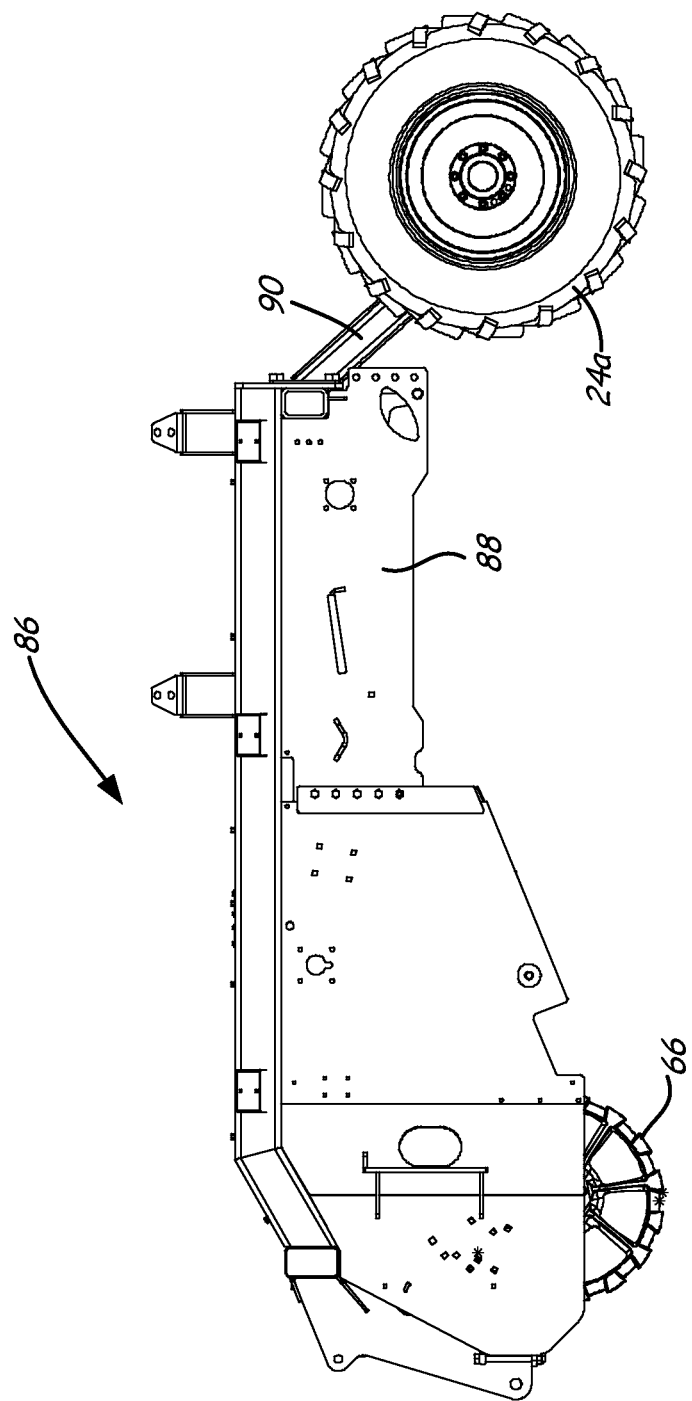
FIG. 11 is a side elevation view of the lower frame of an exemplary 8-row harvester.

As shown in FIGS. 11-12B for an 8-row harvester 86, left axle hydraulic strut 90 for double left wheels 24a, including hydraulic cylinder 36, is attached to a back of frame 88 at left actuation point 40a. In FIG. 12B, the leftmost left carrying wheel 24a and the scrapers 84 have been removed for clarity of illustration. Bracket 76a is attached to frame 88 and supports a pivotal connection 78a of axle carrying member 72a. Double left carrying wheels 24a are mounted on axle 70 of axle carrying member 72a. Hydraulic cylinder 36 is pivotally mounted to bracket 76a at actuation point 40 and is pivotally mounted to axle carrying member 72a at pivot point 82a. Accordingly, extension and retraction of hydraulic cylinder 36 causes the left side of frame 88 to raise and lower at actuation point 40a. While not shown, the right side of harvester 86 is similarly configured with a right axle hydraulic strut for double right wheels attached to the back of frame 88 at a right actuation point. Exemplary harvesters 86 are available from Amity Technology of Fargo, N. Dak., as Sugar Beet Harvester Model Nos. 2300, 2400 and 2500.

In the disclosed system, only three adjustments are needed to effectively and continuously allow the line of digger wheels to follow the ground contour at a desired depth and degree of levelness: a vertical adjustment at the hydraulic hitch cylinders 27, a vertical adjustment to the left side of the harvester frame via left axle hydraulic cylinder 36, and a vertical adjustment to the left side of the harvester frame via right axle hydraulic cylinder 36. This simplicity of design leads to reliable and easy operation and maintenance.

Figure 5:
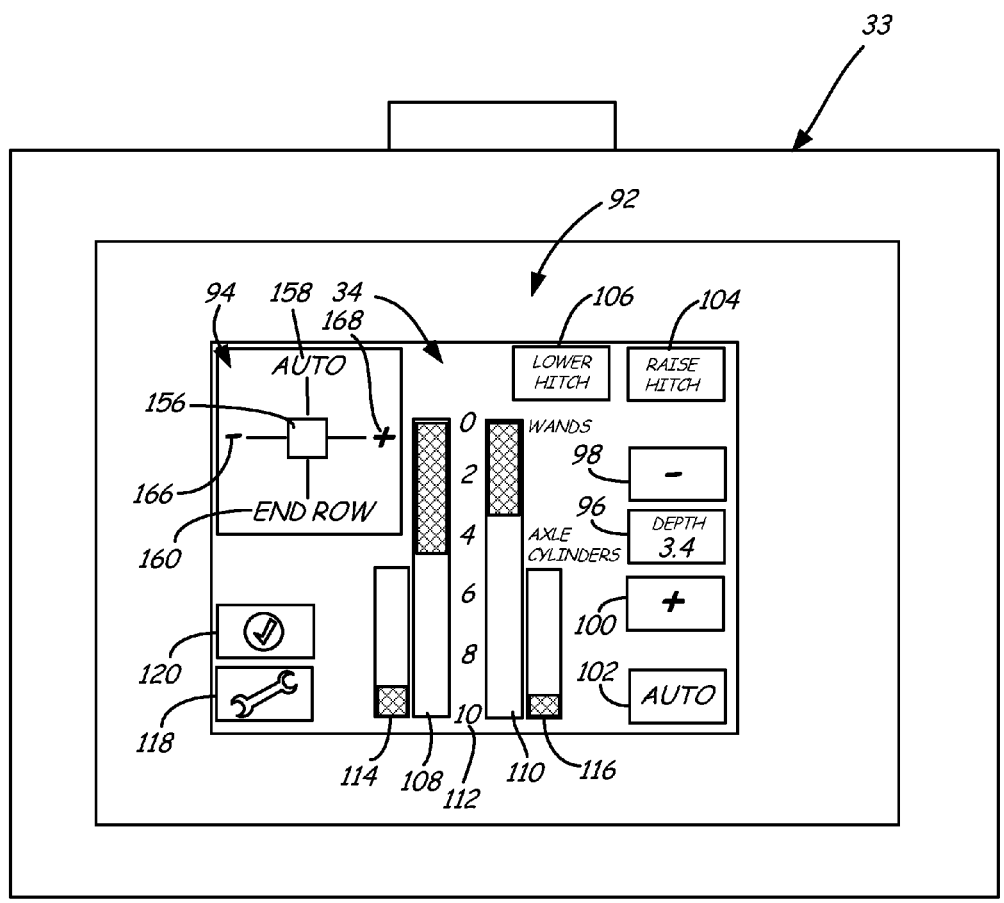
FIG. 5 is a front view of an exemplary operator display/control assembly bearing an exemplary graphical user interface, showing a screen shot of an exemplary Main Screen.
Figure 15A:
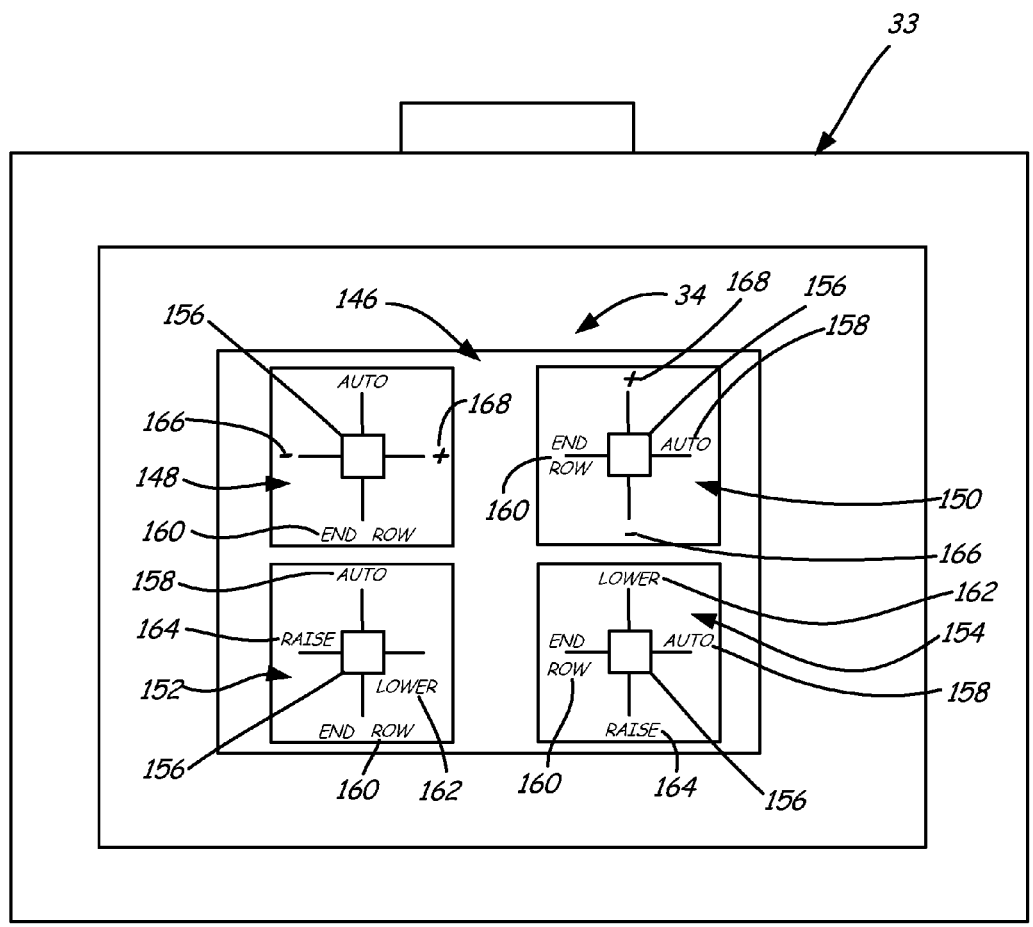
FIG. 15A is a view of an exemplary operator display/control assembly bearing an exemplary graphical user interface, showing a screen shot of an exemplary Joystick Function Selection Screen.
Figure 15B:
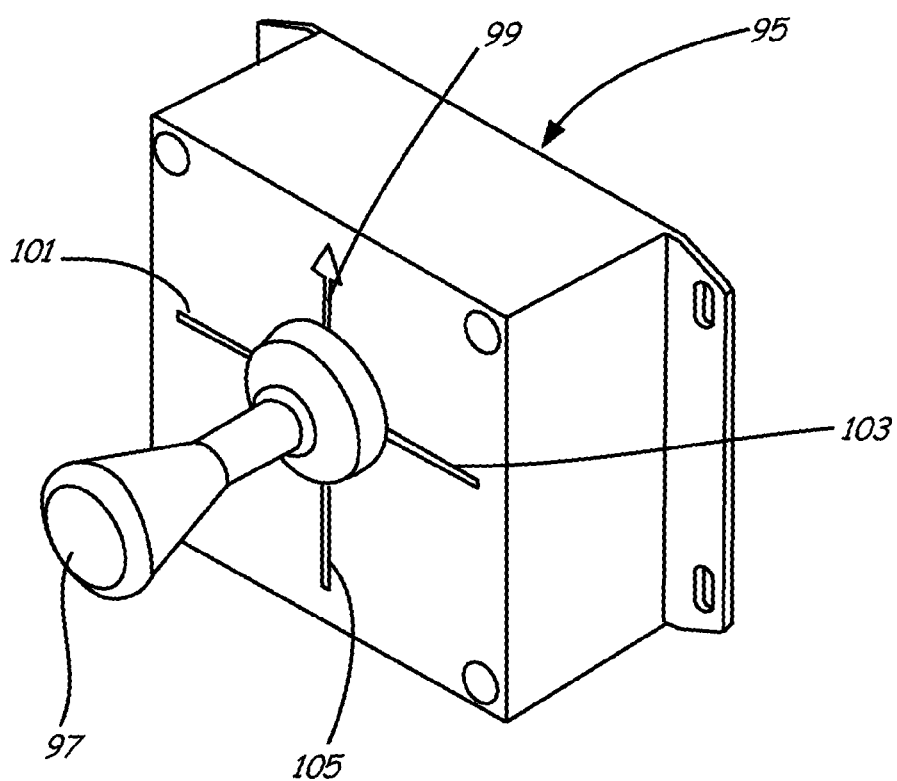
FIG. 15B is a perspective view of an exemplary hardware joystick.

FIG. 5 shows a screen shot of an exemplary main screen 92 on a touch-screen graphical user interface 34. Among other information, main screen 92 relays to the human operator information pertaining to the automatic actuation of the cylinders 27, 36 by the automatic depth and level control system of the present disclosure. Joy stick selection indicator 94 shows the current selection for the functions of a programmable hardware joystick 95 (shown in FIG. 15B) functionally connected to computer 32. Touching joy stick selection indicator 94 brings the user to Joystick Function Selection Screen 146 of FIG. 15A. As shown in FIG. 15B, hardware joystick 95 includes a control stick 97 that can be moved in the up direction 99, left direction 101, right direction 103, or down direction 105. While a touch-screen graphical user interface 34 and hardware joystick 95 are used in an exemplary embodiment, other computer interfaces can also be employed for transmitting information from computer 32 to a human operator and sending commands from the human operator to computer 32.

On Joystick Function Selection Screen 146 (FIG. 15A), the user can choose from one of four joystick configurations 148, 150, 152 and 154 for programming the commands issued to the computer 32 by movement of control stick 97 in each of the directions 99, 101, 103, 105. Such programming is accomplished in an exemplary embodiment by choosing the selection button 156 corresponding to the desired configuration. Once one of the joystick configurations 148, 150, 152 and 154 is selected, the main screen 92 of FIG. 5 returns to the graphical user interface 34, showing the selected configuration on the joystick selection indicator 94 (e.g., configuration 152, as seen in FIG. 5). The selected joystick configuration 148, 150, 152 and 154 remains until another selection is made.

Pushing the hardware joystick in the direction for an "auto" feature 158 causes the computer to automatically extend and retract hydraulic cylinders 27, 36 to follow the terrain sensed by ground contacting sensor arm assemblies 26. This is equivalent to tapping the AUTO button 102 on main screen 92 (FIG. 5). Pushing the hardware joystick in the direction for the "end row" feature 160 raises harvester 10, 86 to its maximum height using hitch cylinders 27. This is equivalent to touching and holding the RAISE HITCH button 104 on main screen 92. Pushing the hardware joystick in the direction for the "lower" feature 162 incrementally retracts hitch cylinder 27. This is equivalent to tapping the LOWER HITCH button 106 on main screen 92. Pushing the hardware joystick in the direction for the "raise" feature 164 incrementally extends hitch cylinder 27. This is equivalent to tapping the RAISE HITCH button 104 on main screen 92. Moving the hardware joystick in the direction for the "−" feature 166 incrementally decreases the depth of digger wheels 66 with respect to the ground surface 62. This is equivalent to tapping the depth reduction button 98 on main screen 92. Moving the hardware joystick in the direction for the "+" feature 168 incrementally increases the depth of digger wheels 66 with respect to the ground surface 62. This is equivalent to tapping the depth increase button 100 on main screen 92. Moving the joystick toward any of the features 160, 162, 164, 166 or 168 deactivates the "auto" mode. While four commonly desired joystick configurations 148, 150, 152 and 154 are shown, it is contemplated that more or fewer may be offered to the user, featuring different arrangements of commands.

On main screen or home screen 92, illustrated in FIG. 5, different colors may be used for joystick configuration selection button 156 to indicate whether or not the hardware joystick is active and whether the AUTO mode is active. For example, when the joystick configuration selection button 156 on main screen 92 is blue, the hardware joystick is active. When AUTO mode for the automatic depth and level control system is active, then the joystick configuration selection button 156 turns green. However, when joystick configuration selection button 156 is red, the hardware joystick is not active. In an exemplary embodiment, for safety reasons, inactivation of the hardware joystick is automatic so that auto mode cannot be engaged if harvester 10 is not moving in direction 17. Tapping the red joystick configuration selection button 156 turns it green, thereby activating the hardware joystick and turning on the AUTO mode.

Depth indicator 96 shows the currently selected operational depth (in inches) of the bottom of the digger wheels 66 relative to the ground surface 62 (i.e., the target distance or depth while running in AUTO mode). In an exemplary embodiment, reference points on the line of implements 18 for the target distance are the lowermost points of digger wheels 66 proximate each ground contacting sensor arm assembly 26. The operator may reduce the depth by tapping depth reduction button 98 and may increase the depth by tapping depth increase button 100 until the desired depth is shown on depth indicator 96. In an exemplary embodiment, each tap on depth reduction button 98, depth increase button 100 or movement of the hardware joystick in toward "−" feature 166 or "+" feature 168 incrementally changes the operational depth by 0.2 inch.

Tapping the AUTO button 102 tells computer 32 to automatically adjust the hydraulic cylinders 27, 36 to maintain the depth indicated at 96 and also the levelness of the harvester in response to feedback from the sensors 49 in ground contacting sensor arm assemblies 26. If the user desires to manually raise the line of digger wheels 18, such as when traveling on a road surface, the user can tap on the RAISE HITCH button 104 for incremental raising or touch and hold the RAISE HITCH button 104 for maximum lifting of the line of digger wheels 18. The line of digger wheels 18 can be lowered by similarly tapping or touching and holding the LOWER HITCH button 106. Left ground contacting sensor arm assembly indicator 108 and right ground contacting sensor arm assembly indicator 110 show the relative movement of the sensor arms 28 relative to the ground surface, thereby relaying information on the depth of the diggers wheels 66 proximate each sensor arm assembly 26. Referring to FIG. 4, the higher the ground level encountered by a sensor arm 28, the more it rotates in direction 48 and the more movement is indicated by 108, 110. In FIG. 5, right indicator 110 is showing more movement than left indicator 108, meaning that there is slightly less clearance under the right corner 21 than under the left corner 20. The numerical scale 112 is arbitrary in an exemplary embodiment but may be correlated to inches or other units if desired. Left axle cylinder indicator 114 and right axle cylinder indicator 116 visually illustrate the extent of extension of left axle hydraulic cylinder 36 and right axle hydraulic cylinder 36, respectively.

Figure 16:
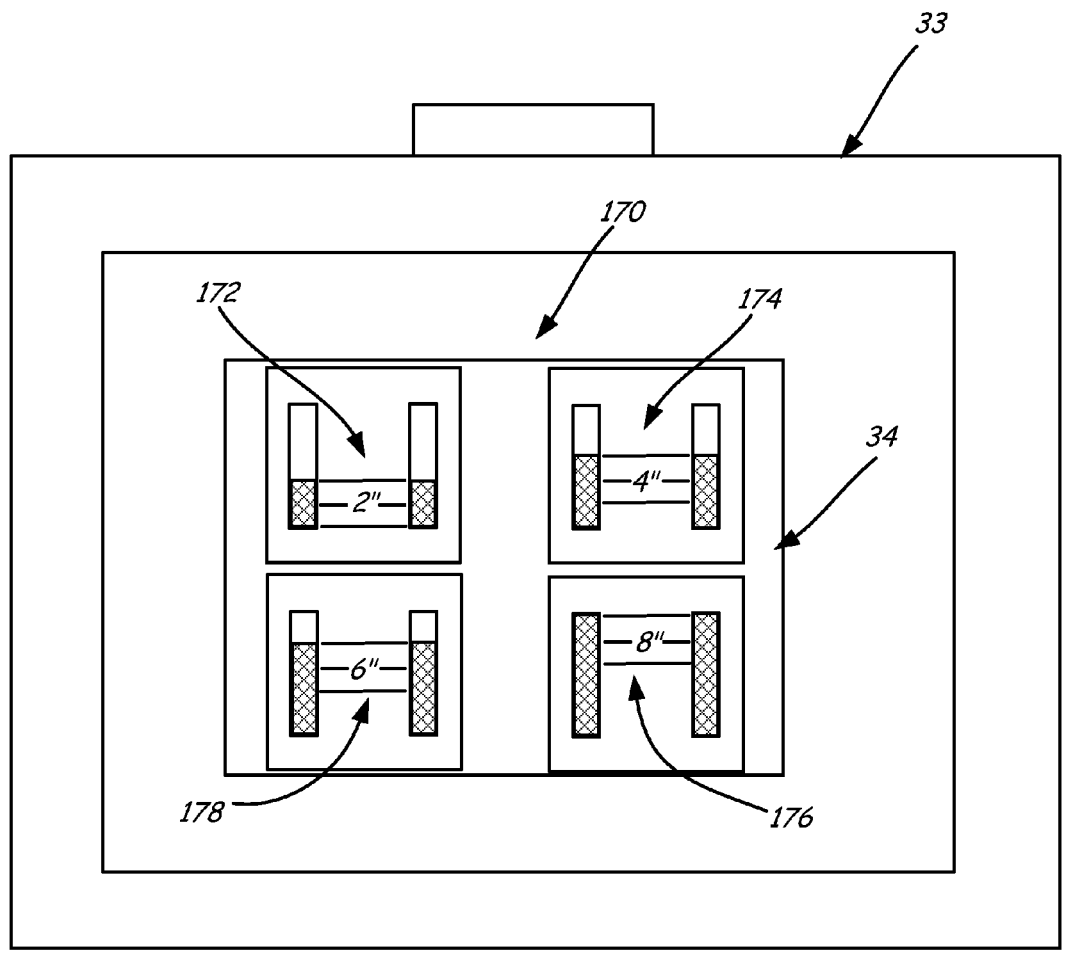
FIG. 16 is a view of an exemplary operator display/control assembly bearing an exemplary graphical user interface, showing a screen shot of an exemplary Axle Cylinder Setpoint Screen.

Tapping either left axle cylinder indicator 114 or right axle cylinder indicator 116 brings the user to Axle Cylinder Setpoint Screen 170 of FIG. 16. At Axle Cylinder Setpoint Screen 170, the user can tap one of four display boxes 172, 174, 176 and 178 to choose the initial center working position setting for cylinders 36, as shown in FIG. 8B. The default setting is typically the 2 inch setting shown in FIG. 8B and display box 172. Selecting a higher level, such as shown in display boxes 174, 176 or 178 results in a higher incline angle from the front to back of harvester 10. As the crops are subjected to a higher angle of travel over the rear jump chain and grab rolls, more cleaning of mud and dirt off the crops is accomplished as they travel more slowly up the incline.

Figure 13:
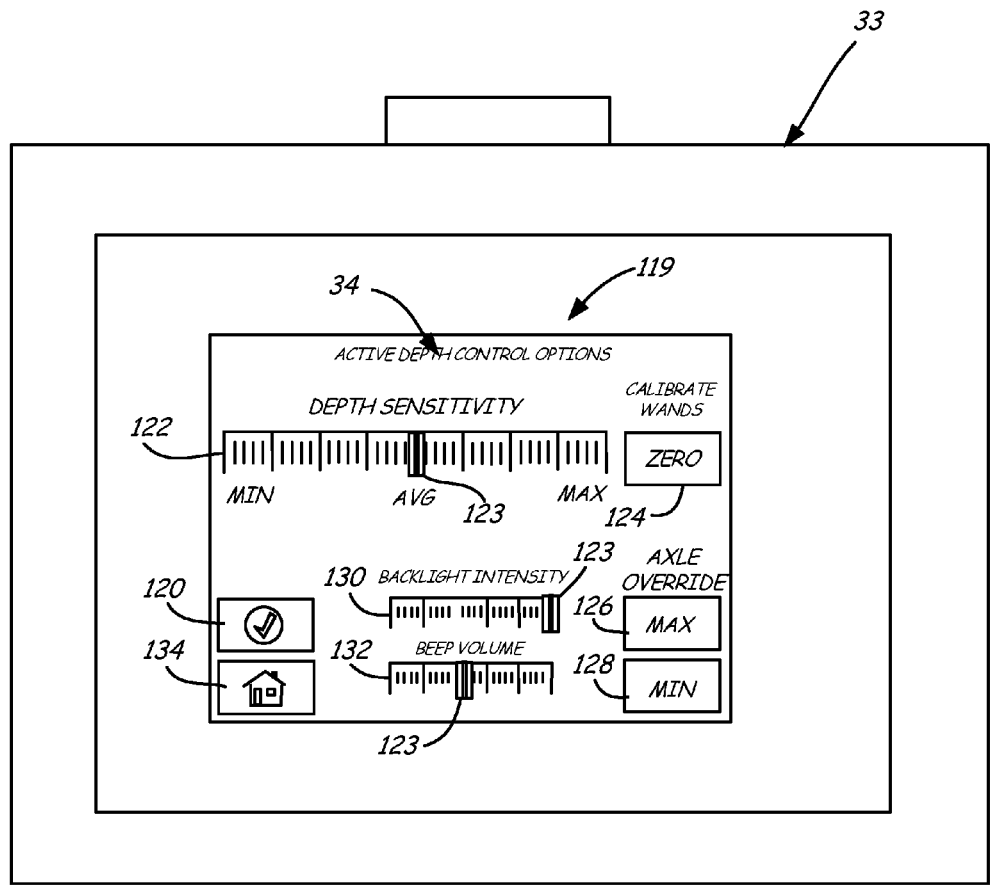
FIG. 13 is a view of an exemplary operator display/control assembly bearing an exemplary graphical user interface, showing a screen shot of an exemplary Options Screen.

Tapping "options" button 118 (FIG. 5) takes a user to the "Active Depth Control Options" screen 119 shown in FIG. 13. Tapping "status" button 120 takes a user to the "Active Depth Control Status" screen 121 shown in FIG. 14. Other features may also be included, such as a speed indicator (not shown).

FIG. 13 is a screen shot of an exemplary "Active Depth Control Options" screen 119 on a graphical user interface 34. "Depth Sensitivity" selector 122 allows a user to control how quickly the system responds to changes in terrain traversed by the harvester 10. In an exemplary embodiment, "Depth Sensitivity" selector 122 is configured as a slider bar with a current setting indicator 123. The setting may be changed by touching the current setting indicator 123 and dragging it to the left to reduce the sensitivity or dragging it to the right to increase the sensitivity. With a higher sensitivity setting, the hydraulic cylinders 27, 36 are very quickly adjusted to offer the most responsive ground contour following. However, in some cases, a slower response time is desired so that the system does not undergo constant adjustment for terrain anomalies such as isolated lumps or potholes. The sensitivity algorithm used by computer 32 takes into account factors such as the ground speed; the distance from the line of digger wheels 18 to the sensor arms 28; and the current differential (plus or minus) from a target depth of the digger wheels 66 into the ground surface 62, which is defined at least in part by the extension positions of the cylinders 27, 36. The position of the hitch cylinders 27 is determined by the average heights of the two sensor arms assemblies 26 and the position of the axle cylinders 36 is determined from the actual height differences of the two sensor arm assemblies. The rate of oil flow through valve 52 (which is variable by the operator on the tractor) can also affect response time.

"Calibrate Wands" button 124 ("ZERO") is generally used on a level surface such as a concrete pad to calibrate newly installed ground contacting sensor arm assemblies 26. With the ground contacting sensor arms 28 and the carrying wheels 24, 25 at the same level, the operator taps calibration button 124 to "zero" out the system. Thereafter, the computer will consider changes to the level of ground contacting sensor arms 28 to correspond to changes in terrain.

Tapping "Axle Override" MAX button 126 fully extends hydraulic axle cylinders 36 ten inches to raise the harvester frame. Such raising may be desirable when traveling down a road, for example, to provide maximum clearance between the harvester frame and the road surface. Tapping "Axle Override" MIN button 128 fully retracts hydraulic axle cylinders 36 to lower the harvester frame. Such lowering may be useful when moving the harvester through a low-clearance door or under a power line, for example. "Backlight Intensity" selector 130 and "Beep Volume" selector 132 are configured as touch and drag slider bars for controlling the visual and audio aspects of the user interface. Tapping "home" button 134 returns a user to main screen 92 of FIG. 5.

Figure 14:
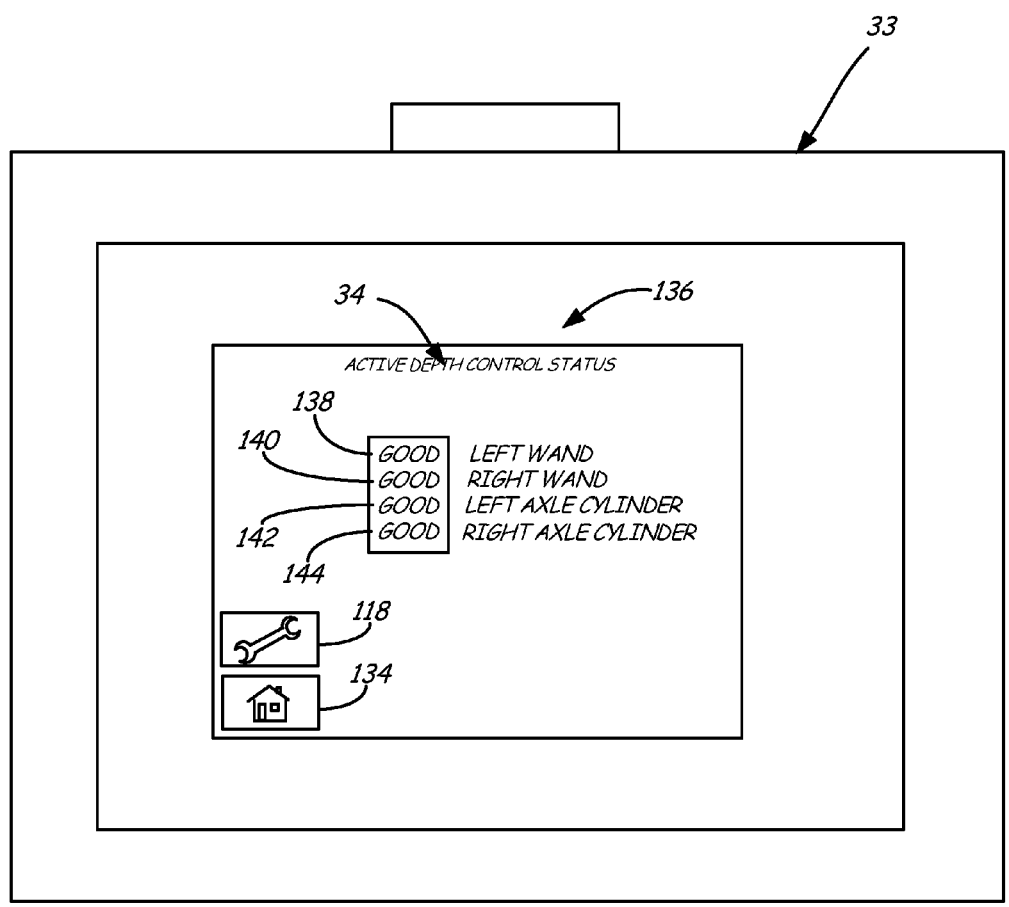
FIG. 14 is a view of an exemplary operator display/control assembly bearing an exemplary graphical user interface, showing a screen shot of an exemplary Status Screen.

Tapping "status" button 120 (FIG. 5) takes a user to status screen 136 of FIG. 14. Status indicator 138 reports a status of left ground contacting sensor arm assembly 26. Status indicator 140 reports a status of right ground contacting sensor arm assembly 26. Status indicator 142 reports a status of left axle hydraulic cylinder 36. Status indicator 144 reports a status of right axle hydraulic cylinder 36. Thus, status screen 136 offers a simple troubleshooting interface that alerts the operator to problems, such as with sensors, the electrical harness, or the hydraulic system. If there is no problem with the input sensors, the term "good" appears in green at the corresponding status indicator 138, 140, 142, 144. If there is a problem with one of the input sensors, the term "FAULT" appears in red at the corresponding status indicator 138, 140, 142, 144. Moreover, if the term "FAULT" appears in red at any of the status indicators 138, 140, 142, 144, on "status" button 120 on main screen 92 (FIG. 5), the green checkmark is replaced by a red "X." If the red "X" is displayed at "status" button 120, the system will not be operable in AUTO mode.

Although the subject of this disclosure has been described with reference to several embodiments, workers skilled in the art will recognize that changes may be made in form and detail without departing from the spirit and scope of the disclosure. In addition, any feature disclosed with respect to one embodiment may be incorporated in another embodiment, and vice-versa. Moreover, while some of the embodiments describe 12-row harvesters and 8-row harvesters, it is understood that the teachings also apply to harvesters of other sizes and configurations.

While this disclosure has described an automated depth and level control system for use with a beet harvester in particular, it is to be understood that the teachings herein can be applied to other agricultural implements as well. For example, while the beet harvester digs into the ground, the automatic depth and level control system disclosed herein can also be used for a harvester that harvests crops above the ground. Moreover, while the vertical position control has been described in some cases as depth control, it is also applicable for use above the ground surface as a height control mechanism.

What is claimed is:

1. A method for automatically positioning a line of implements of an apparatus to follow a ground surface proximate the line of implements as the apparatus moves in a direction of travel across the ground surface, the line of implements being positioned transverse to the direction of travel, the apparatus comprising a forward frame portion and a rear frame portion, the method comprising:
    obtaining a first distance between a left reference point on the forward frame portion of the apparatus and the ground surface and relaying the first distance to a computer;
    obtaining a second distance between a right reference point on the forward frame portion of the apparatus and the ground surface and relaying the second distance to the computer; and
    using the computer to automatically actuate at least one of left and right devices on the rear frame portion to vertically move at least one of left and right sides of the apparatus, respectively, thereby reducing a difference between the first distance and the second distance, wherein each of the left and right devices is positioned on the rear frame portion of the apparatus.

2. The method of claim 1 further comprising using a user interface of the computer to change a center working position of the left and right devices.

3. The method of claim 1 further comprising using a user interface of the computer to program a hardware joystick.

4. The method of claim 1 further comprising:
    using a user interface of the computer to provide a target distance to the computer between a reference point on the line of implements and the ground surface, and
    using the computer to automatically actuate at least one of the left and right devices to move the reference point on the line of implements closer to the target distance with respect to the ground surface.

5. The method of claim 4 wherein the reference point on the line of implements is below the ground surface.

6. The method of claim 1 further comprising using the computer to automatically actuate a third device to move the reference point on the line of implements closer to the target distance with respect to the ground surface.

7. The method of claim 1 further comprising using a user interface of the computer to manually vertically move the line of implements relative to the ground surface.

8. A system comprises:
a computer;
a user interface through which a human operator receives information from the computer and issues commands to the computer;
an apparatus comprising:
   a crop harvesting assembly configured as a line of implements positioned on a forward frame portion of the apparatus, the line being transverse to a direction of travel of the apparatus;
   a left ground contacting element attached to the forward frame portion;
   a first device for adjusting a vertical position of a left side of a rear frame portion of the apparatus;
   a right ground contacting element attached to the forward frame portion; and
   a second device for adjusting a vertical position of a right side of a rear frame portion of the apparatus,
   wherein the first and second devices are independently operable, and
   wherein adjustment of a vertical position of at least one of the left and right sides of a rear frame portion of the apparatus results in tilting the line of implements at the forward frame portion relative to a horizontal plane defined at a ground surface under the left and right ground contacting elements of the rear frame portion;
a first sensor that is configured to relay information pertaining to a first distance determined by the left ground contacting element to the computer;
a second sensor that is configured to relay information pertaining to a second distance determined by the right ground contacting element to the computer;
wherein the computer is configured to automatically actuate at least one of the first and second devices based at least upon the first distance and the second distance; and
wherein information pertaining to the automatic actuation is configured to be relayed to the operator through the user interface.

9. The system of claim 8 wherein the information pertaining to the automatic actuation comprises information on an extent of actuation of each of the first and second devices.

10. The system of claim 8 wherein the information pertaining to the automatic actuation comprises information on the first distance and the second distance.

11. The system of claim 8 wherein the user interface is a touch-screen graphical user interface.

12. A method for automatically positioning a line of implements of an apparatus as the apparatus moves in a direction of travel, the line of implements being positioned transverse to the direction of travel, the apparatus comprising a forward frame portion and a rear frame portion, the method comprising:
   obtaining a first vertical clearance distance relative to a left reference point on the forward frame portion of the apparatus and relaying the first vertical clearance distance to a computer;
   obtaining a second vertical clearance distance relative to a right reference point on the forward frame portion of the apparatus and relaying the second vertical clearance distance to the computer; and
   using the computer to automatically actuate at least one of left and right devices to vertically move at least one of left and right sides of the apparatus, respectively, thereby reducing a difference between the first vertical clearance distance and the second vertical clearance distance, wherein each of the left and right devices is positioned on the rear frame portion of the apparatus.

13. The method of claim 12 further comprising using a user interface of the computer to change a center working position of the left and right devices.

14. The method of claim 12 further comprising using a user interface of the computer to program a hardware joystick.

15. The method of claim 12 further comprising:
   using a user interface of the computer to provide a target vertical clearance distance to the computer relative to a reference point on the line of implements, and
   using the computer to automatically actuate at least one of the left and right devices to move the reference point on the line of implements closer to the vertical clearance target distance.

16. The method of claim 15 wherein the reference point on the line of implements is below a ground surface.

17. The method of claim 12 further comprising using the computer to automatically actuate a third device to move the reference point on the line of implements closer to the target vertical clearance distance.

18. The method of claim 12 further comprising using a user interface of the computer to manually vertically move the line of implements relative to a ground surface.

* * * * *